US008595737B2

(12) United States Patent
Ichikawa et al.

(10) Patent No.: US 8,595,737 B2
(45) Date of Patent: Nov. 26, 2013

(54) METHOD FOR MIGRATING A VIRTUAL SERVER TO PHYSICAL SERVER ACCORDING TO A VARIATION RATIO, A REFERENCE EXECUTION TIME, A PREDETERMINED OCCUPIED RESOURCE AMOUNT AND A OCCUPANCY AMOUNT

(75) Inventors: Yujirou Ichikawa, Yokohama (JP);
Yoshifumi Takamoto, Kokubunji (JP);
Keisuke Hatasaki, Kawasaki (JP);
Takashi Tameshige, Tokyo (JP)

(73) Assignee: Hitachi, Ltd., Tokyo (JP)

(*) Notice: Subject to any disclaimer, the term of this patent is extended or adjusted under 35 U.S.C. 154(b) by 330 days.

(21) Appl. No.: 12/712,775

(22) Filed: Feb. 25, 2010

(65) Prior Publication Data

US 2010/0325634 A1 Dec. 23, 2010

(30) Foreign Application Priority Data

Mar. 17, 2009 (JP) ................................. 2009-064077

(51) Int. Cl.
G06F 9/455 (2006.01)
G06F 9/46 (2006.01)
G06F 3/00 (2006.01)
G06F 13/00 (2006.01)

(52) U.S. Cl.
USPC ............... 718/103; 718/1; 718/105; 718/102; 718/104; 710/5; 711/162

(58) Field of Classification Search
USPC .......... 718/1, 105, 102, 104; 710/5; 709/105, 709/221; 707/204; 711/162
See application file for complete search history.

(56) References Cited

U.S. PATENT DOCUMENTS 6,314,472 B1* 11/2001 Trieu et al. .................... 710/5
7,849,168 B2* 12/2010 Utsunomiya et al. ......... 709/221
8,095,929 B1* 1/2012 Ji et al. ............................. 718/1
2002/0002578 A1* 1/2002 Yamashita .................... 709/105
2005/0268298 A1 12/2005 Hunt et al.
2007/0055714 A1* 3/2007 Ishii et al. ..................... 707/204
2007/0169121 A1 7/2007 Hunt et al.
2008/0034366 A1* 2/2008 Tanaka et al. .................... 718/1
2008/0216086 A1* 9/2008 Tanaka et al. ................. 718/105
2008/0313641 A1* 12/2008 Inoue et al. ................... 718/104
2009/0077557 A1* 3/2009 Ichikawa et al. ............. 718/102
2009/0125691 A1* 5/2009 Nakanishi ..................... 711/162
2009/0144732 A1* 6/2009 Tanaka ............................. 718/1
2010/0325378 A1* 12/2010 Maruyama et al. ........... 711/162

FOREIGN PATENT DOCUMENTS

JP 2004-234114 A 8/2004

* cited by examiner

Primary Examiner — Thomas Lee
Assistant Examiner — Aurel Prifti
(74) Attorney, Agent, or Firm — Kilpatrick Townsend & Stockton LLP

(57) ABSTRACT

Occupancy amount of physical resource of a virtual server (VS) is calculated based on maximum physical resource amount indicating performance of a physical server (PS), the occupied virtual resource coefficient indicating relation of physical resource amount used by the VS to the physical resource amount allocated to the VS and the allocated physical resource coefficient indicating relation of the allocated physical resource to the maximum physical resource amount of the PS, and change value of the occupied physical resource amount from a predetermined occupied physical resource amount is calculated based on the calculated occupancy amount and the predetermined occupied physical resource amount. The migration time required of the VS is calculated based on the calculated change value, variation ratio indicating degree of influence exerted by change of the occupied virtual resource coefficient of the VS on the required migration time and reference execution time set based on the predetermined occupied physical resource amount.

14 Claims, 25 Drawing Sheets

FIG. 4

MIGRATION MEANS
INFORMATION TABLE 310

| MEANS IDENTIFIER | VARIATION RATIO | | | | NECESSARY PHYSICAL RESOURCE AMOUNT | | | | EXECUTION SPEED |
|---|---|---|---|---|---|---|---|---|---|
| | CPU | MEMORY | N/W | DISK | CPU | MEMORY | N/W | DISK | |
| LIVE MIGRATION | 2 | 2.5 | 1.2 | 1 | 0.5GHz | 0.8GB | 0.6Gbps | 0.1GB | 3 |
| QUICK MIGRATION | 1.3 | 1.5 | 1 | 1 | 0.3GHz | 0.8GB | 0.1Gbps | 3GB | 10 |
| SHUT DOWN (N+1) | 1.2 | 1.2 | 1 | 1 | 0.15GHz | 0.6GB | 0.05Gbps | 0.01GB | 300 |
| VM IMAGE CONVERT | 1 | 1 | 1 | 1.5 | 0.7GHz | 2.4GB | 0.05Gbps | 50GB | 600 |

FIG. 5

VIRTUAL RESOURCE
INFORMATION TABLE  311

| VIRTUAL SERVER IDENTIFIER | HOST IDENTIFIER | OCCUPIED VIRTUAL RESOURCE COEFFICIENT | | | ALLOCATED PHYSICAL RESOURCE COEFFICIENT | | | |
|---|---|---|---|---|---|---|---|---|
| | | CPU | MEMORY | N/W | DISK | CPU | MEMORY | N/W | DISK |
| VM1 | Host-1 | 20% | 70% | 70% | 5% | 5% | 25% | 50% | 10% |
| VM2 | Host-1 | 60% | 30% | 15% | 30% | 20% | 12.5% | 10% | 10% |
| VM3 | Host-1 | 50% | 20% | 10% | 10% | 20% | 22.5% | 10% | 10% |
| VM4 | Host-1 | 80% | 60% | 5% | 60% | 10% | 30% | 20% | 25% |

PHYSICAL RESOURCE
INFORMATION TABLE  312

| HOST IDENTIFIER | OCCUPIED PHYSICAL RESOURCE AMOUNT | | | | MAXIMUM PHYSICAL RESOURCE AMOUNT | | | |
|---|---|---|---|---|---|---|---|---|
| | CPU | MEMORY | N/W | DISK | CPU | MEMORY | N/W | DISK |
| Host-1 | 0.31GHz | 3.68GB | 0.38Gbps | 39G | 1GHz | 8GB | 1Gbps | 200G |
| Host-2 | 0.1GHz | 0.4GB | 0.15Gbps | 15G | 2GHz | 8GB | 2Gbps | 200G |

FIG. 7

FAILOVER INFORMATION TABLE    313

| VIRTUAL SERVER IDENTIFIER | TIME REQUIRED | | | |
|---|---|---|---|---|
| | LIVE | QUICK | SHUT DOWN | CONVERT |
| VM1 | 20.4 | 17.5 | 300 | 600 |
| VM2 | 12.5 | 13 | 300 | 600 |
| VM3 | 8.3 | 10.8 | 300 | 600 |
| VM4 | 33.3 | 26 | 300 | 600 |

MIGRATION SCHEDULE INFORMATION TABLE    314

| EXECUTION ORDER | VIRTUAL SERVER IDENTIFIER | MEANS IDENTIFIER | MIGRATION DESTINATION HOST IDENTIFIER | START TIME |
|---|---|---|---|---|
| 1 | VM3 | LIVE | Host-2 | 0 |
| 2 | VM2 | LIVE | Host-2 | 0 |
| 3 | VM2 | QUICK | Host-2 | 8.3 |
| 4 | VM4 | QUICK | Host-2 | 8.3 |

WORK INFORMATION TABLE  316

| WORK IDENTIFIER | VIRTUAL SERVER IDENTIFIER | SLA | |
|---|---|---|---|
| | | PRIORITY | DOWN PERMISSIBLE TIME |
| WORK A | VM1 | 3 | 300 |
| WORK B | VM2, VM3 | 10 | 60 |
| WORK C | VM4 | 5 | 200 |

FIG. 25

RISK INFORMATION TABLE  317

| RISK IDENTIFIER | CONDITION |
|---|---|
| CPU TEMPERATURE ABNORMAL | NOT USE CPU BEYOND 60 % |
| NETWORK ADAPTER TROUBLE | NOT USE NETWORK RESOURCE |

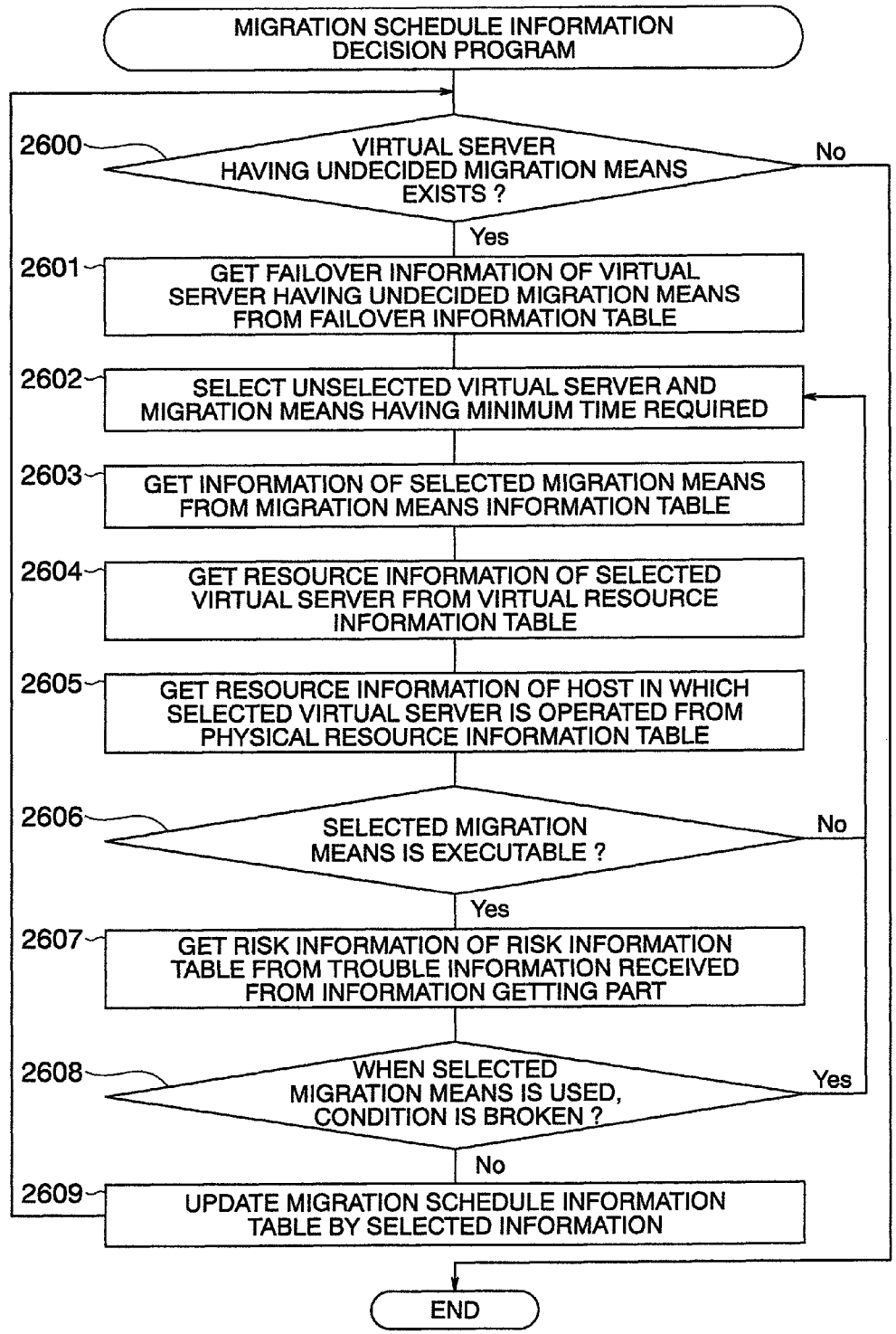

METHOD FOR MIGRATING A VIRTUAL SERVER TO PHYSICAL SERVER ACCORDING TO A VARIATION RATIO, A REFERENCE EXECUTION TIME, A PREDETERMINED OCCUPIED RESOURCE AMOUNT AND A OCCUPANCY AMOUNT

INCORPORATION BY REFERENCE

The present application claims priority from Japanese application JP2009-064077 filed on Mar. 17, 2009, the content of which is hereby incorporated by reference into this application.

BACKGROUND OF THE INVENTION

The present invention relates to a computer system including a virtualization system and more particularly to technique of deciding a migration method (means and execution order) of a virtual server.

Virtualization systems include, as disclosed in, for example, JP-A-2004-234114 and US2007/0169121A1, means for migrating a virtual server between virtualization systems for the purpose of failover upon occurrence of physical trouble and load dispersion. The migration means each have different stop time, execution speed and necessary resources and accordingly a manager decides the migration means for each of virtual servers beforehand in consideration of availability of work operated in each virtual server.

SUMMARY OF THE INVENTION

In the above prior-art method, however, the migration means decided beforehand cannot satisfy the availability supposed by the manager according to the operation situation of the system upon migration of the virtual server sometimes.

Accordingly, it is an object of the present invention to decide migration means and execution order of virtual server according to the operation situation of system upon migration of the virtual server.

According to an aspect of the present invention, in a method of deciding a migration method of a virtual server and a management server performing the method, the management server is connected to a physical server and the migration method of migrating the virtual server operated in a virtualization system which is operated in the physical server is decided. The decision method includes a physical resource information table for storing therein occupied physical resource amount indicating physical resource amount used by the virtualization system and maximum physical resource amount indicating performance of the physical server which operates the virtualization system in corresponding manner to the virtualization system, a virtual resource information table for storing therein allocated physical resource coefficient indicating relation of physical resource amount allocated to the virtual server by the virtualization system to the maximum physical resource amount of the physical server and occupied virtual resource coefficient indicating relation of physical resource amount used by the virtual server to the physical resource amount allocated to the virtual server in corresponding manner to the virtual server, and a migration means information table for storing therein necessary physical resource amount indicating physical resource amount necessary for execution of the migration means, variation ratio indicating degree of influence exerted by change of the occupied virtual resource coefficient of the virtual server on migration time required of the virtual server by the migration means and reference execution time set on the basis of predetermined occupied physical resource amount in corresponding manner to a plurality of migration means of the virtual server and performs the following: calculating occupancy amount of physical resource of the virtual server on the basis of the maximum physical resource amount, the occupied virtual resource coefficient and the allocated physical resource coefficient, calculating change value of the occupied physical resource amount from the predetermined occupied physical resource amount on the basis of the calculated occupancy amount of physical resource and the predetermined occupied physical resource amount, and calculating the migration time required of the virtual server by the migration means on the basis of the calculated change value, the variation ratio and the reference execution time.

According to another aspect of the present invention, the migration means having short migration time required of the virtual server is selected.

According to still another aspect of the present invention, when there are a plurality of virtual servers, migration order of the virtual servers by the migration means is defined to start from the virtual server having short migration time required corresponding to the migration means selected for the virtual server.

According to still another aspect of the present invention, a parallelism information table for storing therein maximum parallel degree indicating permissible value of parallel execution of the migration means is provided and the migration means corresponding to the plurality of virtual servers are executed in parallel in the execution order within range in which the maximum parallel degree is not exceeded.

According to still another aspect of the present invention, a work information table indicating relation between work performed by each of the plurality of virtual servers and priority of the work is provided and the virtual server which performs work having high priority is selected to execute the migration means corresponding to the virtual server.

According to still another aspect of the present invention, the work information table contains down permissible time of work and the virtual server to be stopped beforehand is decided with reference to the down permissible time.

According to still another aspect of the present invention, a risk information table indicating correspondence of risk identifier indicating trouble occurring in the physical server and operation condition upon occurrence of the trouble is provided and the migration means of the virtual server is selected within range in which the operation condition is not broken.

According to the present invention, the migration means of the virtual server and the execution order can be decided in accordance with the present situation upon migration of the virtual server to improve the availability.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing structure of a migration means information table;

FIG. 5 is a diagram showing structure of a virtual resource information table;

FIG. 6 is a diagram showing structure of a physical resource information table;

FIG. 7 is a diagram showing structure of a failover information table;

FIG. 8 is a diagram showing structure of the migration schedule information table;

FIG. 18 is a diagram showing structure of a work information table;

FIG. 25 is a diagram showing structure of a risk information table; and

FIG. 26 is a flow chart showing processing of a seventh migration schedule information decision part.

DESCRIPTION OF THE EMBODIMENTS

Embodiments of the present invention are now described with reference to the accompanying drawings.

Embodiment 1

Figure 1:
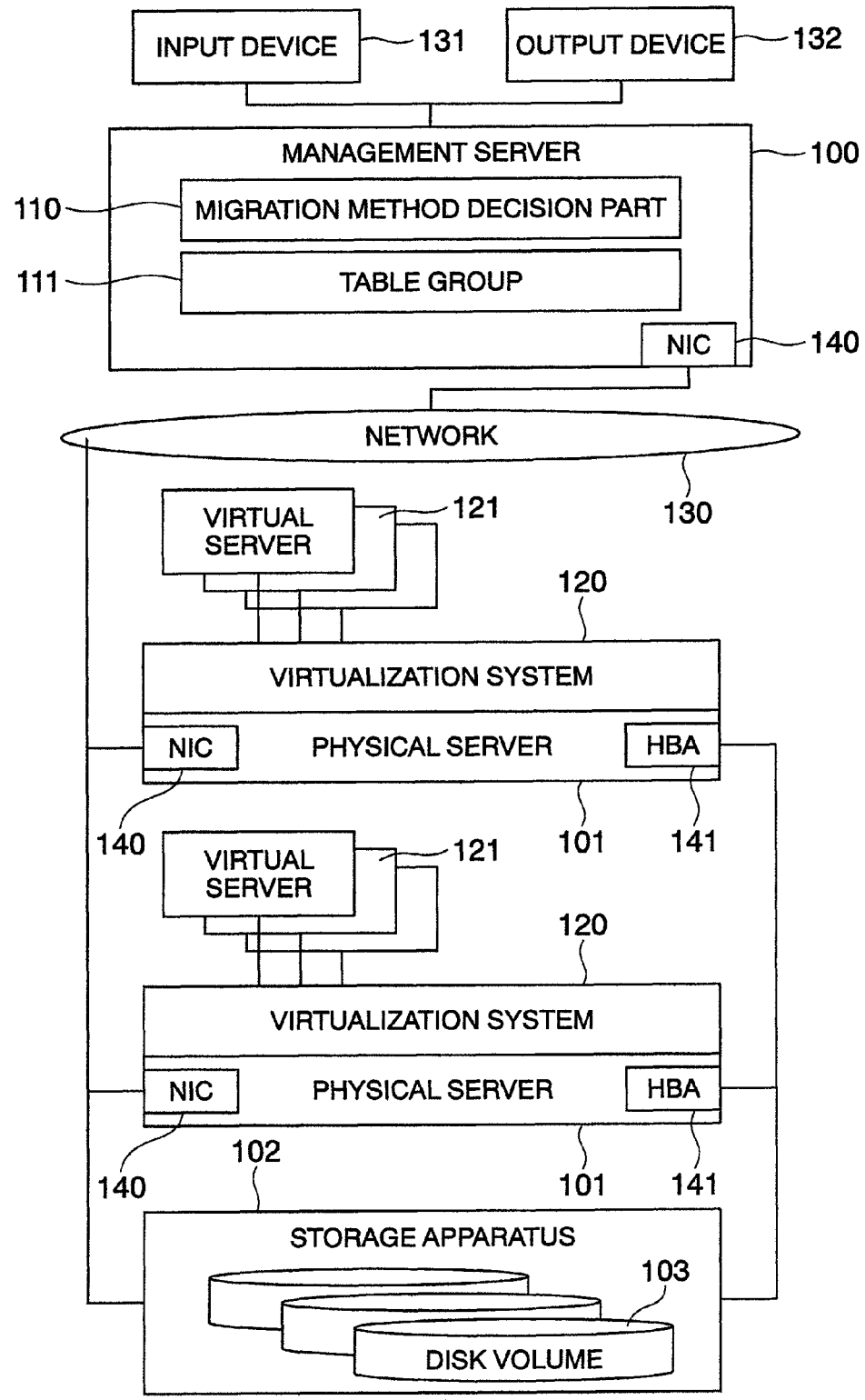
FIG. 1 is a block diagram schematically illustrating a computer system.

FIG. 1 schematically illustrates a computer system. The computer system includes a management server 100, one or more physical servers 101, a storage apparatus 102 and one or more networks 130.

The physical server 101 is a computer operated by program control and includes a network interface card (NIC) 140 connected to the network 130 and a host bus adaptor (HBA) 141 connected to the storage apparatus 102. The physical server 101 is connected through the network 130 to the management server 100, another physical server 101 and the storage apparatus 102. Furthermore, the physical server 101 includes a virtualization system 120 operated therein.

The virtualization system 120 is a program for operating virtual servers 121 and divides physical resources, central processing unit (CPU) and memory included in the virtualization system to be allocated to the virtual servers 121 as virtual resources.

The management server 100 is a computer operated by program control and an input device 131 and an output device 132 used by user (manager of this computer system) of the management server 100 are connected to the management server 100. The management server 100 includes a network interface card (NIC) 142 connected to the network 130. The management server 100 is connected through the network 130 to the physical servers 101 and the storage 102. The management server 100 includes a migration method decision part 110 operated by the management server and a table group 111 necessary for operation of the migration method decision part 110. Tables included in the table group 111 are described later with reference to table structure examples shown in FIG. 4 et seqq.

The storage apparatus 102 includes a fiber channel (FC) and a local area network (LAN) interface and constitutes a memory system including one or more disk volumes 103. The disk volumes 103 store therein images of the virtual servers 121 (execution program operated as the virtual servers 121).

The network 130 represents one or more network apparatuses and a network system constructed by connecting the network apparatuses mutually. The network apparatuses include network switches, routers, load balancers and fire walls concretely.

Figure 2:
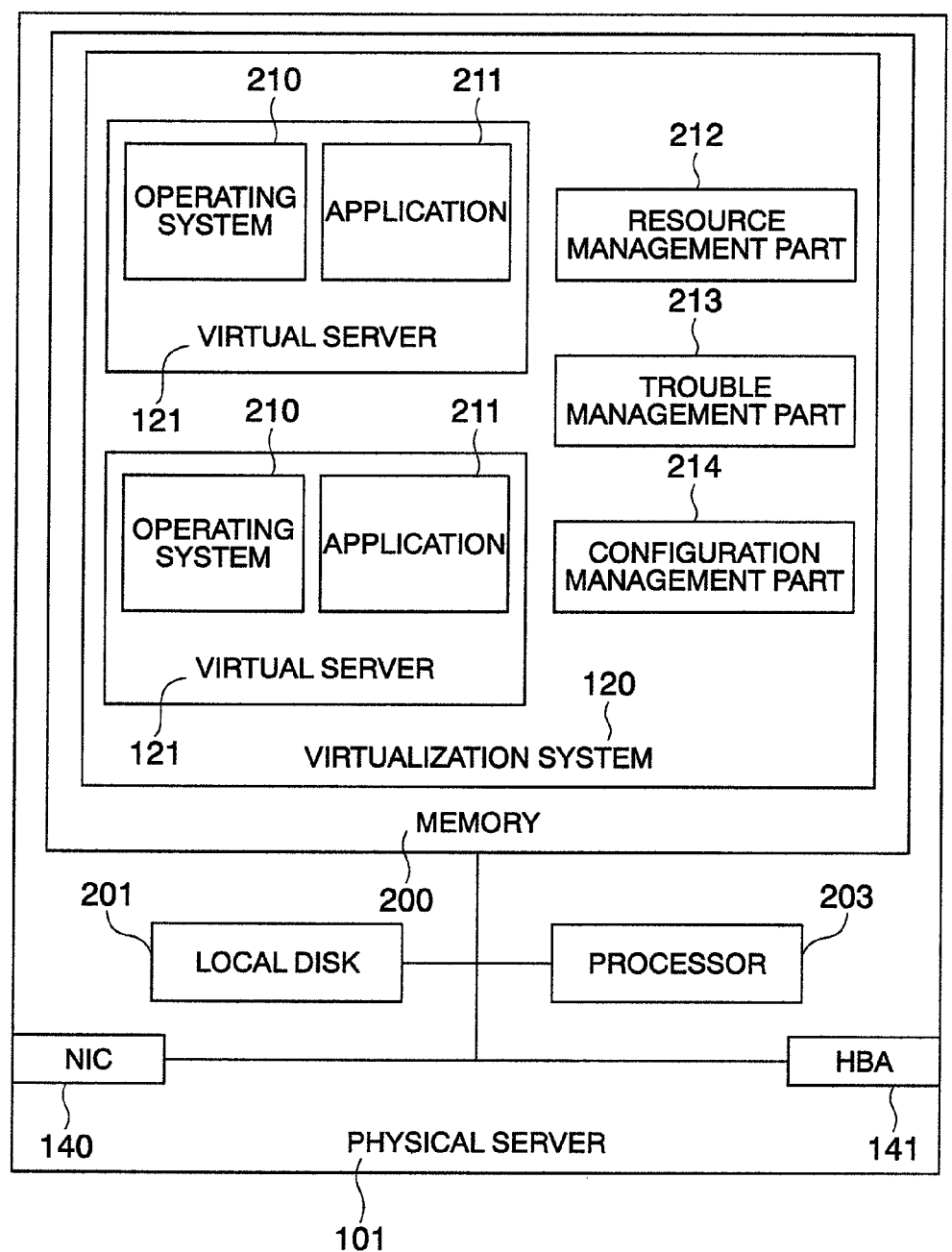
FIG. 2 is a block diagram schematically illustrating a physical server.

FIG. 2 schematically illustrates the physical server 101. The physical server 101 includes memory 200, local disk 201, NIC 140, processor (CPU) 203 and HBA 141. The local disk 201 is used as an auxiliary memory device. The physical server 101 may use a flash memory as the auxiliary memory device. The physical server 101 may include plural NIC's and HBA's.

The memory 200 stores therein the program for operating the virtualization system 120. In the virtualization system 120, virtual servers 121, resource management part 212, trouble management part 213 and configuration management part 214 are operated.

The virtual server 121 is a logical computer constituted by emulating the physical computer and programs such as operating system (OS) 210 and application 211 are operated in the virtual server 121 using the virtual resources allocated by the virtualization system 120.

The resource management part 212 measures load information (CPU occupancy ratio and memory occupancy amount) of the physical server 101 and the virtual server 121 and arranges the present load information on the basis of instruction issued from an information getting part 302 described later. The resource management part 212 transmits the arranged load information to the information getting part 302. The information transmitted to the information getting part 302 by the resource management part 212 may contain information measured in the past.

The trouble management part 213 detects trouble (increased temperature in CPU, abnormal number of revolution of fan and the like) occurred in the physical server 101 and the virtualization system 120 and arranges information indicating trouble contents on the basis of instruction issued from the information getting part 302, so that the trouble management part 213 transmits the arranged information to the information getting part 302.

The configuration management part 214 collects configuration information (host name, virtual server name and the like) concerning the virtualization system 120 and the virtual servers 121 and arranges the collected information on the basis of instruction issued from the information getting part 302, so that the configuration management part 214 transmits the arranged information to the information getting part 302.

Figure 3:
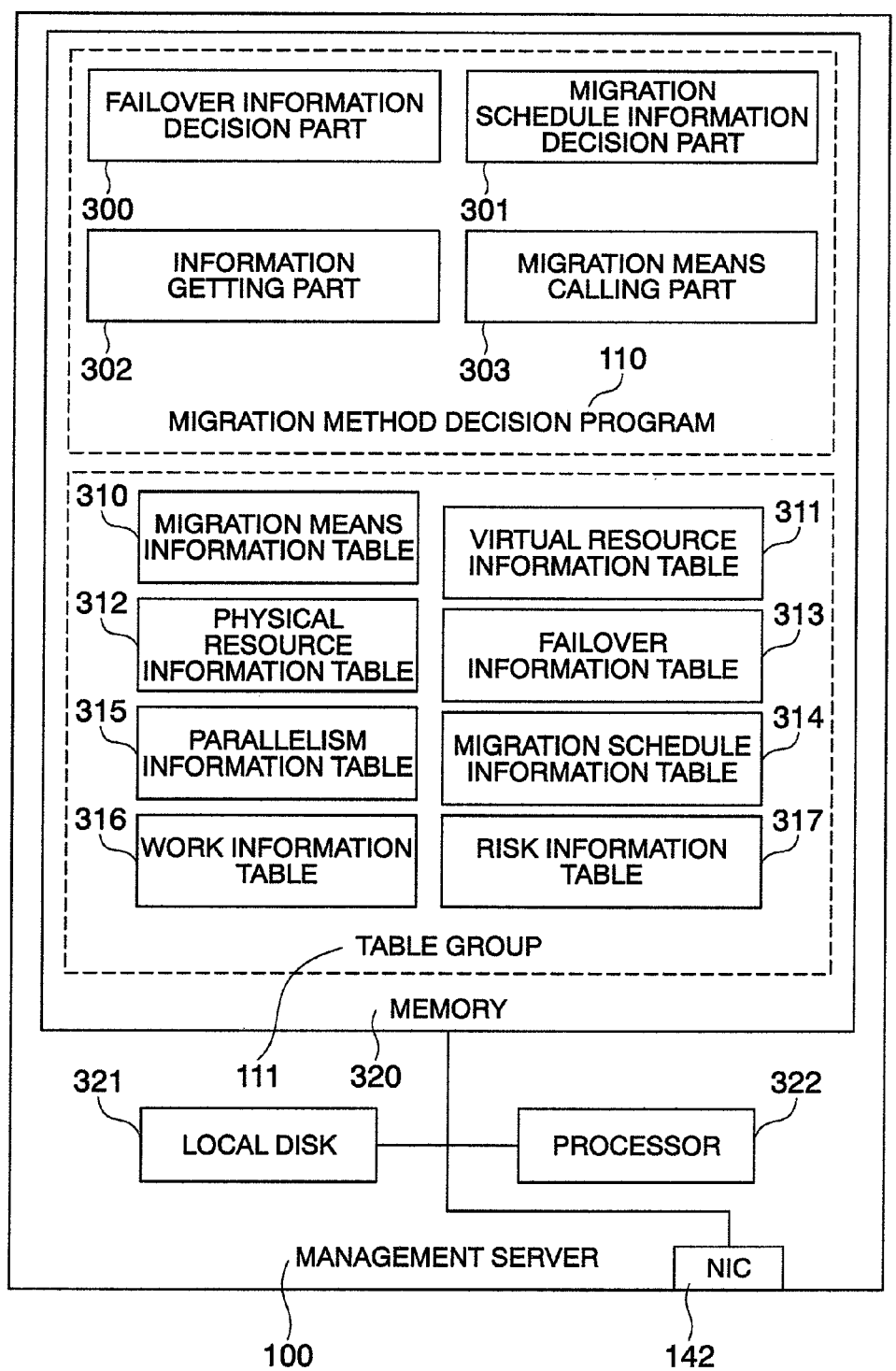
FIG. 3 is a block diagram schematically illustrating a management server.

FIG. 3 schematically illustrates the management server 100. The management server 100 includes memory 320, local disk 321, NIC 142 and CPU 322. The local disk 321 is used as an auxiliary memory device. The management server 100 may use a flash memory as the auxiliary memory device. Furthermore, the management server 100 may include plural NIC's.

The memory 320 stores therein the migration method decision part 110 and the table group 111. The migration method decision part 110 includes a failover information decision part 300, a migration schedule information decision part 301, the information getting part 302 and a migration means calling part 303. The table group 111 includes a migration means information table 310, a virtual resource information table 311, a physical resource information table 312, a failover information table 313, a migration schedule information table 314, a parallelism information table 315, a work information table 316 and a risk information table 317. In the embodiment, the migration method decision part 110 is described as being a program executed by CPU (processor), although it may be constructed by hardware or firmware mounted in the management server 100 or by combination thereof. Furthermore, the migration method decision part 110 is stored in the auxiliary memory device 321 included in the management server 100 and is loaded into the memory 320 therefrom upon execution thereof to be executed by CPU.

The failover information decision part 300 prepares the failover information table 313 in response to instruction issued from the migration method decision part 110. The migration schedule information decision part 301 prepares the migration schedule information table 314 in response to instruction issued from the migration method decision part 110. The information getting part 302 gets information necessary for operation of the failover information decision part 300 and the migration schedule information decision part 301 from the physical servers 101 through the network 130. The migration means calling part 303 operates the virtualization system 120 and the virtual server 121 to migrate the virtual server 121.

FIG. 4 shows an example of the migration means information table 310. The migration means information table 310 holds specification information of the migration means. Column 400 shows means identifiers for identifying migration means. Concretely, the means identifiers are names defined by means provider and user (or system manager). Column 401 shows relation (variation ratio) between change in occupancy state of resources of the virtual server and time required for migration of the virtual server. The variation ratio 401 represents the degree of influence exerted by change in physical resource amount occupied by the virtual server on the time required for migration. The physical resource amount contains, for example, CPU operation frequency for CPU, memory capacity for memory, network communication speed for network (N/W) and disk capacity for disk. The variation ratio 401 includes sub-columns corresponding to physical resources such as CPU, memory, N/W and disk and the sub-columns represent the degrees of influence exerted by change in occupancy amount of the physical resources on the time required for migration individually. Column 402 shows physical resource amounts necessary for execution of the migration means. The necessary physical resource amounts 402 include sub-columns corresponding to physical resources such as CPU, memory, N/W and disk and the sub-columns represent the necessary amount of the physical resources. The column 403 shows reference execution time (seconds) of the migration means (for example, minimum time required and the like).

In the embodiment, the variation ratios 401 are described as being variation magnification factors of the time required for migration in case where the occupancy amount of physical resources such as CPU is increased twice while the occupancy amount of physical resources at the time that the reference execution time 403 is decided is defined as reference, although the variation ratios 401 may use values calculated by another calculation method such as variation magnification factors in case where the occupancy amount is increased X times (X is an integer or real number). For example, it is supposed that the virtual server 121 having the identifier of VM1 described later with reference to FIG. 5 uses the resource amounts shown in FIG. 5. However, if it is supposed that the relevant virtual server 121 uses twice the predetermined occupancy amount of CPU and one and half times the predetermined occupancy amount of memory when virtual server is about to be migrated by live migration, the migration time (execution time) of the virtual server 121 is calculated by calculating change value (for example, ratio) from the predetermined occupancy amount of occupied virtual resource coefficient 502 for each physical resource and calculating the time required for migration on the basis of the calculated change value, the variation ratio 401 of physical resource corresponding thereto and the reference execution time 403 (for example, multiplication).

When numerical values in first lines of FIGS. 4 and 5 are used by way of example, the execution time of $3 \times (2/2 \times 2) \times (2.5/2 \times 1.5) = 3 \times 2 \times 1.875 = 11.25$ seconds is required.

FIG. 5 shows an example of the virtual resource information table 311. The virtual resource information table 311 holds the occupancy state of physical resources of the virtual server 121. Column 500 shows virtual server identifiers for identifying the virtual servers 121 and column 501 shows host identifiers for identifying the virtualization systems 120. The identifiers are names defined by the means provider and user (or system manager) concretely. Column 502 shows occupancy states of physical resources (occupied virtual resource coefficient) of the virtual server 121. In the embodiment, the occupied virtual resource coefficient 502 is represented as the ratio of the physical resource amount occupied by the virtual server 121 to the physical resource amount allocated to the virtual server 121 by the virtualization system 120, although the occupied virtual resource coefficient 502 may contain absolute value, relative value in case where another virtual server 121 operated in the same virtualization system 120 is set to 1 and weight in case where the virtualization system 120 allocates physical resource to a plurality of virtual servers 121 so that the physical resource are shared by the plurality of virtual servers 121. The occupied virtual resource coefficient 502 includes sub-columns corresponding to physical resources such as CPU, memory, N/W and disk and the sub-columns represent occupancy states of the physical resources. Column 503 shows allocation state of physical resources to the virtual server 121 by the virtualization system 120 (allocated physical resource coefficient). In the embodiment, the allocated physical resource coefficient 503 is represented as the ratio of the physical resource amount allocated to the virtual server 121 by the virtualization system 120 to the physical resource amount possessed by the physical server 101, although the allocated physical resource coefficient 503 may contain absolute value, relative value in case where another virtual server 121 operated in the same virtualization system 120 is set to 1 and weight in case where the virtualization system 120 allocates physical resource to a plurality of virtual servers 121 so that the physical resource are shared by the plurality of virtual servers 121. Furthermore, the allocated physical resource coefficient 503 includes sub-columns corresponding to physical resources such as CPU, memory, N/W and disk and the sub-columns represent allocation states of the physical resources.

FIG. 6 shows an example of the physical resource information table 312. The physical resource information table 312 holds the occupancy state of physical resources of the virtualization system 120. Column 600 shows host identifiers for identifying the virtualization systems 120. Concretely, the host identifiers are names defined by the means provider and user (or system manager). Column 601 shows physical resource amounts occupied by the virtualization system 120 (occupied physical resource amounts). The occupied physical resource amount 601 includes sub-columns for CPU, memory, N/W and disk to show the occupancy amounts of these components. Column 602 shows maximum amounts of physical resources provided in the virtualization system (maximum physical resource amounts). The maximum physical resource amounts 602 represent performance (capability) of the physical server and represent the maximum values of CPU operation frequency, memory capacity, network communication speed and storage capacity concretely.

In the embodiment, the values of column 602 are represented for the case where the virtualization system includes a single CPU, although the values of column 602 may use values in case where the virtualization system includes a plurality of CPU's and where the virtualization system includes a single CPU having a plurality of cores.

FIG. 7 shows an example of the failover information table 313. The failover information table 313 holds the time required for migration for each migration means of the virtual server 121. Column 700 shows virtual server identifiers for identifying the virtual servers 121. Concretely, the virtual server identifiers are names defined by the user (or system manager). Column 701 shows the time required for migration for each migration means of the virtual server. The required time 701 includes sub-columns for storing therein the time required corresponding to the means identifiers 400 shown in FIG. 4.

FIG. 8 shows an example of the migration schedule information table 314. The migration schedule information table 314 holds the migration method of the virtual server 121. Column 800 shows order (execution order) that the virtual server 121 is migrated. Column 801 shows virtual server identifiers for identifying the virtual servers 121. Concretely, the virtual server identifiers are names defined by the user (or system managers). Column 802 shows migration means (means identifiers) used for migration of the virtual servers 121. Column 803 shows migration destinations of the virtual servers 121. Concretely, the migration destinations are migration destination host identifiers for identifying the virtualization systems 120 of migration destinations. Column 804 shows start time of migration of the virtual servers 121. Concretely, the start time are relative time calculated on the basis of the time that the start time of the virtual server started first is defined to 0.

In the embodiment, the start time is set to an integer in units of second, although it may be set using another unit such as microsecond.

Figure 9:
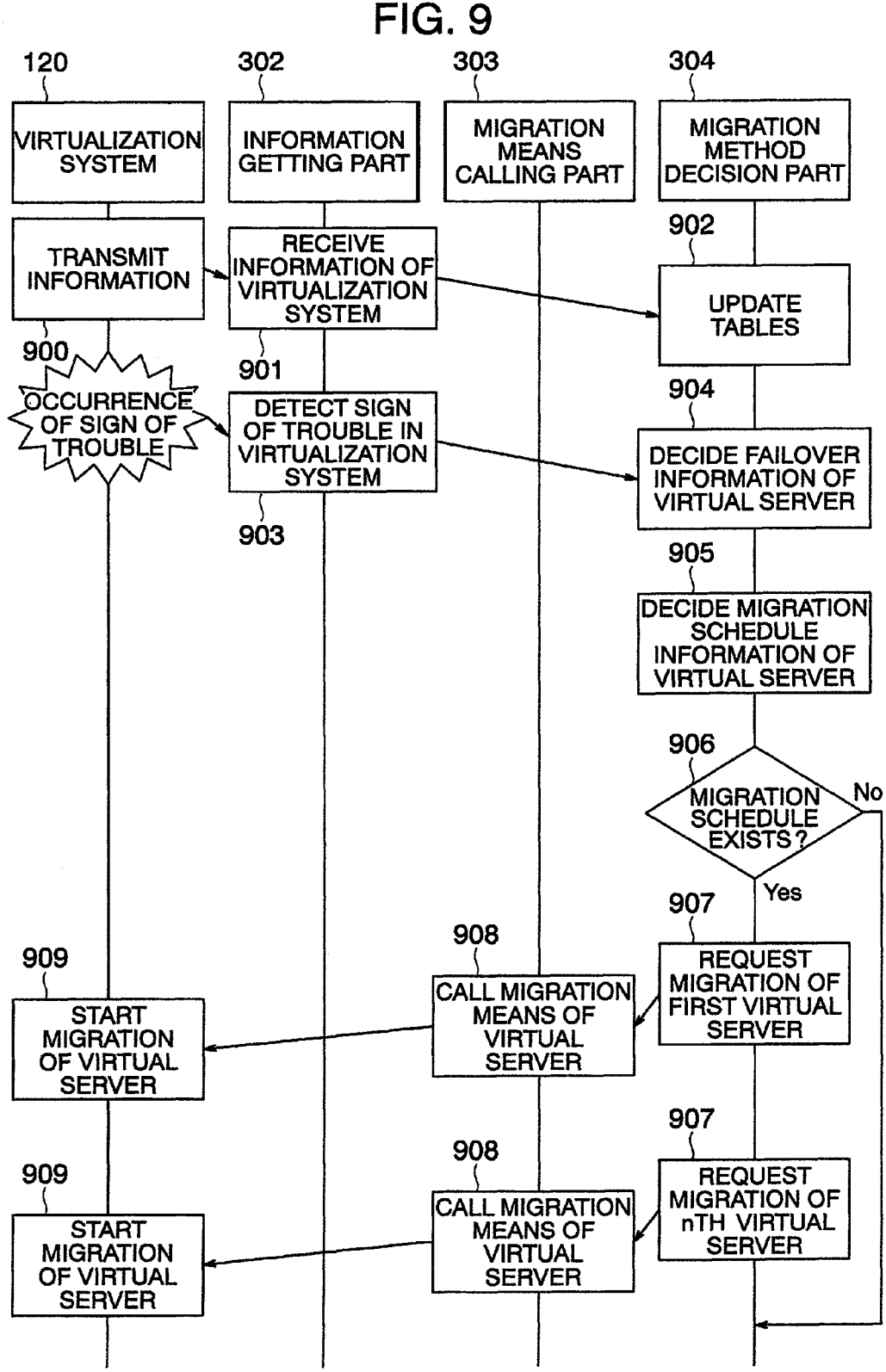
FIG. 9 is a flow chart showing an example of processing sequence between management server and virtualization system.

FIG. 9 is a flow chart showing an example of the processing sequence between the management server 100 and the virtualization system 120. The resource management part 212, the trouble management part 213 and the configuration management unit 214 of the virtualization system 120 arrange information managed by themselves and transmit the information to the information getting part 302 in response to instruction from the information getting part 302 (processing 900). The information getting part 302 receives the information of the virtualization system 120 transmitted from the resource management part 212, the trouble management part 213 and the configuration management part 214 (processing 901). The migration method decision part 110 updates the virtual resource information table 311 and the physical resource information table 312 on the basis of the gotten information of the virtualization system 120 (processing 902).

The management server 100 takes the opportunity of detecting a sign of trouble in the physical server 101 in which the virtualization system 120 is operated (processing 903) and the migration method decision part decides failover information concerning the virtual server 121 operated in the virtualization system 120 in which the opportunity was found (processing 904). In the embodiment, the opportunity of detection in processing 903 has been described as detection of the sign of trouble in the physical server 101, although maintenance of hardware constituting the physical server 101, dispersion of loads among plural virtualization systems 120, notification of event from hardware or software and information set through graphical user interface (GUI) of the input device 131 and the output device 132 by the user may be used as the opportunity. The migration method decision part 110 decides the migration means and the execution order (migration schedule information) of the virtual server 121 (processing 905).

The migration method decision part 110 confirms whether migration schedule information is decided (processing 906). When the migration schedule information is not decided, the processing is ended.

The migration method decision part 110 instructs the migration means calling part 303 to migrate the virtual server 121 having the first execution order on the basis of the prepared migration schedule information (processing 907). The migration means calling part 303 calls the migration means of the virtual server 121 cooperating with the virtual server 121 and the virtualization systems 120 of migration source and migration destination of the virtual server 121 (processing 908). The virtualization system 120 migrates the virtual server 121 (processing 909). After completion of the migration of the virtual server 121 having the first execution order, the migration method decision part 110 repeats the processing 907 for the virtual servers 121 having the second execution order et seqq. indicated by the migration schedule information. Processing 908 by the migration means calling part 303 and processing 909 by the virtualization system 120 are executed after the processing 907 by the migration method decision part 110 is executed.

Figure 10:
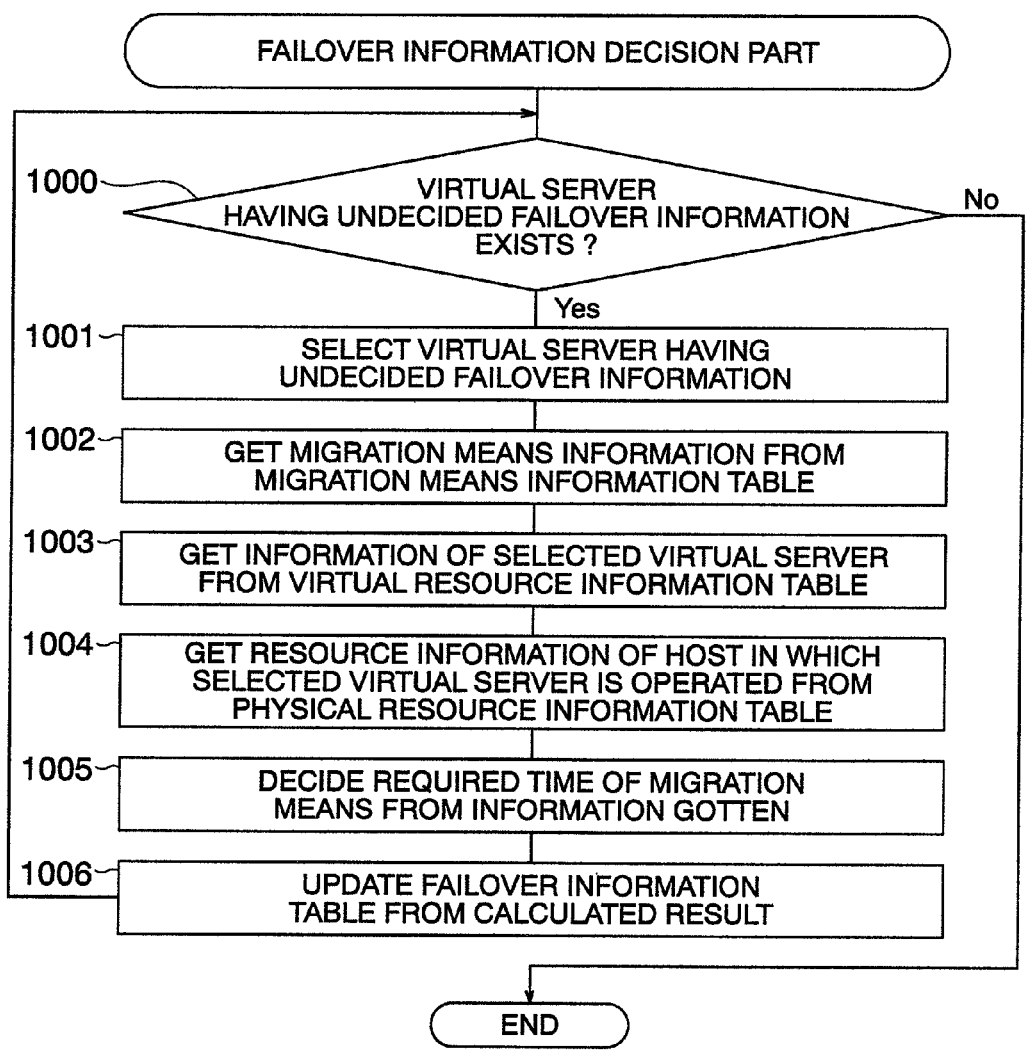
FIG. 10 is a flow chart showing processing of a failover information decision part.

FIG. 10 is a flow chart showing processing of the failover information decision part 300 included in the migration method decision part 110. The processing of the failover information decision part 300 corresponds to the processing 904 of FIG. 9. The failover information decision part 300 confirms whether the failover information concerning the virtual server 121 to be migrated is undecided, that is, whether there is the virtual server 121 to be migrated of which entry does not exist in the failover information table 313 (step 1000). When there is not the virtual server, the processing is ended. When there is the virtual server, virtual server 121 to be migrated is decided on the basis of detection of sign of trouble in the virtualization system 120 and the physical server 101 before the migration method decision part 110 starts processing of the failover information decision part 300.

The failover information decision part 300 selects any one of virtual servers 121 having undecided failover information (step 1001). The failover information decision part gets the means identifier 400, the variation ratio 401, the necessary physical resource amount 402 and the execution speed 403 for each migration means in the migration means information table 310 (step 1002). The failover information decision part 300 gets record having the virtual server identifier 500 in the virtual resource information table 311 concerning the virtual server 121 selected in step 1001 (step 1003). The failover information decision part 300 gets the maximum physical resource amount 602 of record in the physical resource information table 312 having the same host identifier 600 as the host identifier 501 of the record gotten in step 1003 (step 1004).

Next, the failover information decision part 300 uses the information gotten in steps 1002, 1003 and 1004 to decide the time required for migration of the virtual server 121 selected in step 1001 when the migration means are used (step 1005). The time required for migration is calculated as follows: The physical resource amount being used by the virtual server 121 is calculated from the occupied virtual resource coefficient 502, the allocated physical resource coefficient 503 and the maximum physical resource amount 602, and the change value (for example, ratio) from the fundamental occupied physical resource amount for each physical resource such as CPU and memory set on the basis of the occupied physical resource amount upon decision of the execution speed 403 is calculated from the calculated physical resource amount. Then, the time required for migration is calculated (for example, multiplication) from the calculated change value, the variation ratio 401 and the execution speed.

A new record having the virtual server identifier 500 gotten in step 1003 and the time required for migration decided in step 1005 is added in the failover information table 313 (step 1006). The processing is returned to step 1000 and the same processing for another virtual server 121 having undecided failover information is repeated. The failover information table 313 shown in FIG. 7 is prepared by the above processing.

Figure 11:
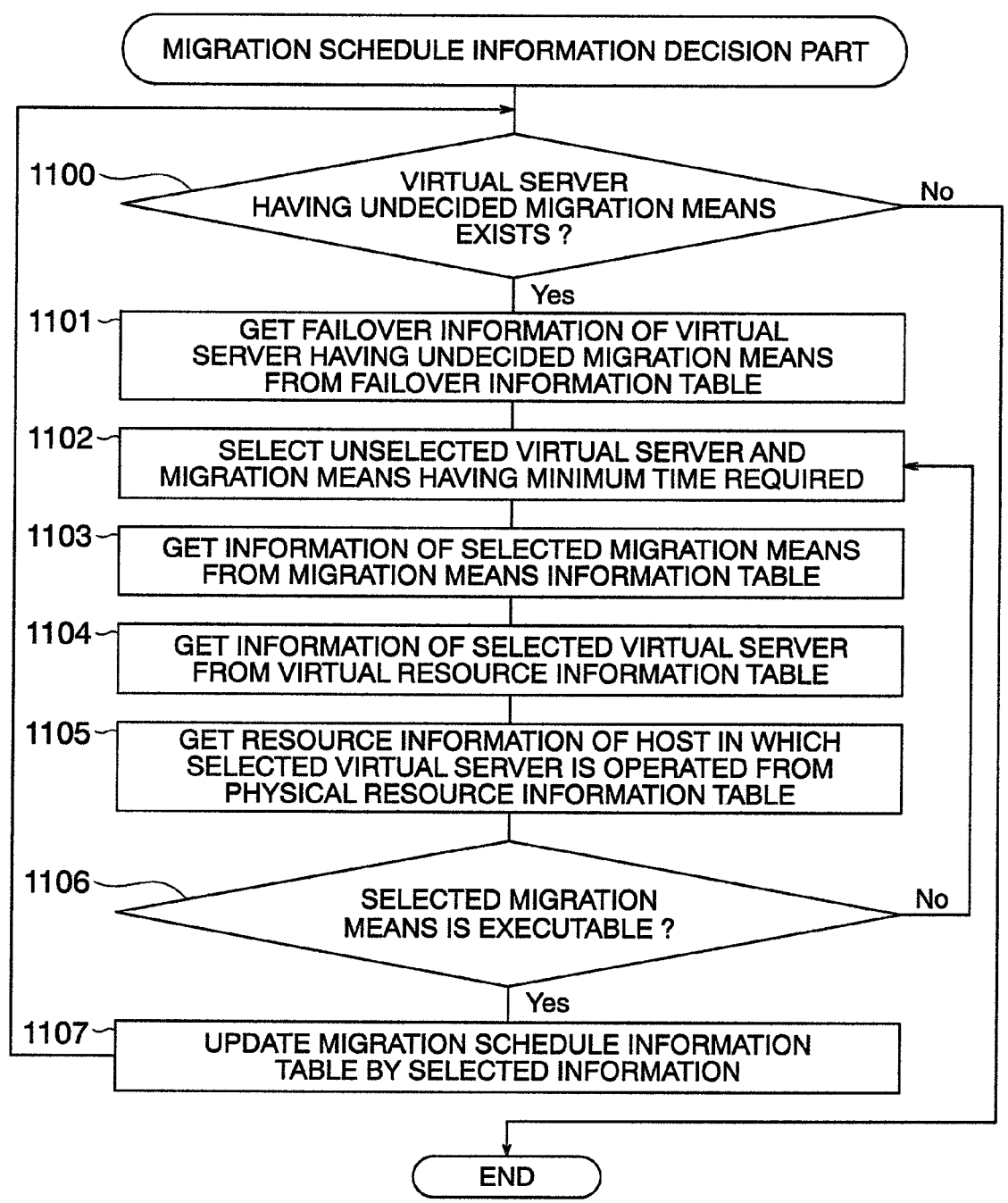
FIG. 11 is a flow chart showing processing of a first migration schedule information decision part.

FIG. 11 is a flow chart showing processing of the migration schedule information decision part 301 of the migration method decision unit 110. The processing of the migration schedule information decision part 301 corresponds to the processing 905 of FIG. 9. The migration schedule information decision part 301 confirms whether the migration means for the virtual server 121 to be migrated is undecided, that is, whether entry containing the virtual server identifier 801 of the virtual server 121 to be migrated exists in the migration schedule information table 314 (step 1100). When there is no entry, the processing is ended. The virtual server 121 to be migrated is decided on the basis of information of the failover information table 313 before the migration method decision part 110 starts processing of the failover information decision part 300.

Record that the migration means of the virtual server 121 to be migrated in the failover information table 313 is undecided, that is, record of the virtual server 121 to be migrated of which virtual server identifier 700 exists in the failover information table 313 and of which entry containing the virtual server identifier 801 does not exist in the migration schedule information table 314 is gotten from the failover information table 313 (step 1101). When a plurality of virtual servers 121 are to be migrated, a set of virtual server 121 and migration means having the minimum required time 701 and which is not selected once in this processing is selected (step 1102). The necessary physical resource amount 402 of record having the means identifier 400 of the migration means information table 310 for the migration means selected in step 1102 is gotten (step 1103). The host identifier 501 of record having the virtual server identifier 500 of the virtual resource information table 311 for the virtual server selected in step 1102 is gotten (step 1104). The record of the physical resource information table 312 having the same host identifier as the host identifier 501 gotten in step 1104 is gotten (step 1105).

The migration schedule information decision part 301 evaluates whether the virtual server and the migration means selected in step 1102 are executable using information gotten in steps 1103, 1104 and 1105 (step 1106). When they are executable, the processing proceeds to step 1107 and when they are not executable, the processing is returned to step 1102. In the evaluation as to whether they are executable or not, the sum of components such as CPU, memory and the like of the occupied physical resource amount 601 and the necessary physical resource amount 402 is calculated and when there is no component having the sum exceeding the maximum physical resource amount 602, it is judged that the virtual server 121 and the migration means thereof are executable.

Next, the virtual server identifier 801, the means identifier 802, the execution order 800 and the migration destination host identifier 803 for the virtual server 121 and the migration means selected in step 1102 are added in the migration schedule information table 315 as new record (step 1107). The migration method decision part 110 decides the execution order 800 as the consecutive order from the top record and the migration destination host identifier as the host identifier of the physical server 101 in which the virtualization system 120 having the lightest load is operated.

As described above, the migration method decision part 110 can decide the migration means and the execution order of the virtual server 121 which can improve the availability of the system from the loads on the virtualization system 120 and the virtual server 121 and the specification information 310 of each migration means.

Figure 12:
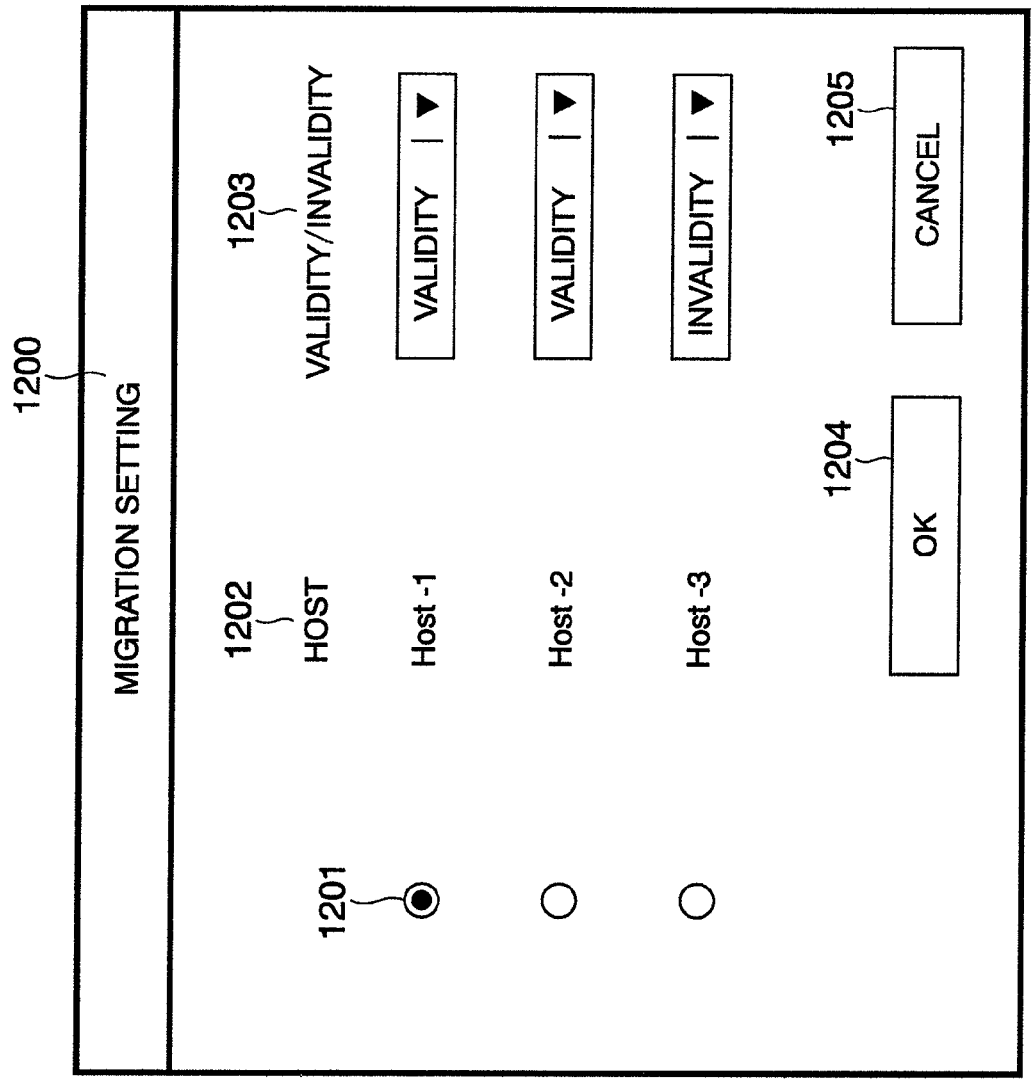
FIG. 12 shows an example of a graphical user interface (GUI) for selecting a migration method of a migration method decision part.

FIG. 12 shows an example of a graphical user interface (GUI) as an example of a user interface (UI) provided by the migration method decision part 110 to make the user set validity/invalidity of operation of the migration method decision part 110. This GUI is displayed in the output device 132 connected to the management server 100 or a display device of another terminal connected to the management server 100 through the network 130 by means of browser or dedicated program and text and the like.

Buttons for operation are displayed in a migration setting window 1200. The user clicks button 1201 to select the virtualization system 120 to be set. The selected button 1201 is shown as double circle (inside is black dot) in an example of FIG. 12. Host 1202 shows host identifier of the physical server 101 in which the virtualization system 120 is operated as identifier for identifying the virtualization system 120 to be selected. Validity/invalidity 1203 is used to select whether the migration method decision part 110 is used (validated) to the virtualization system 120 selected by the button 1201. In the example of FIG. 12, the validity/invalidity is selected by means of pull-down menu. When the validity is selected, child window 1400 of the window 1200 is displayed. When the setting is updated, button 1204 is clicked and when it is canceled, cancel button 1205 is clicked.

Figure 13:
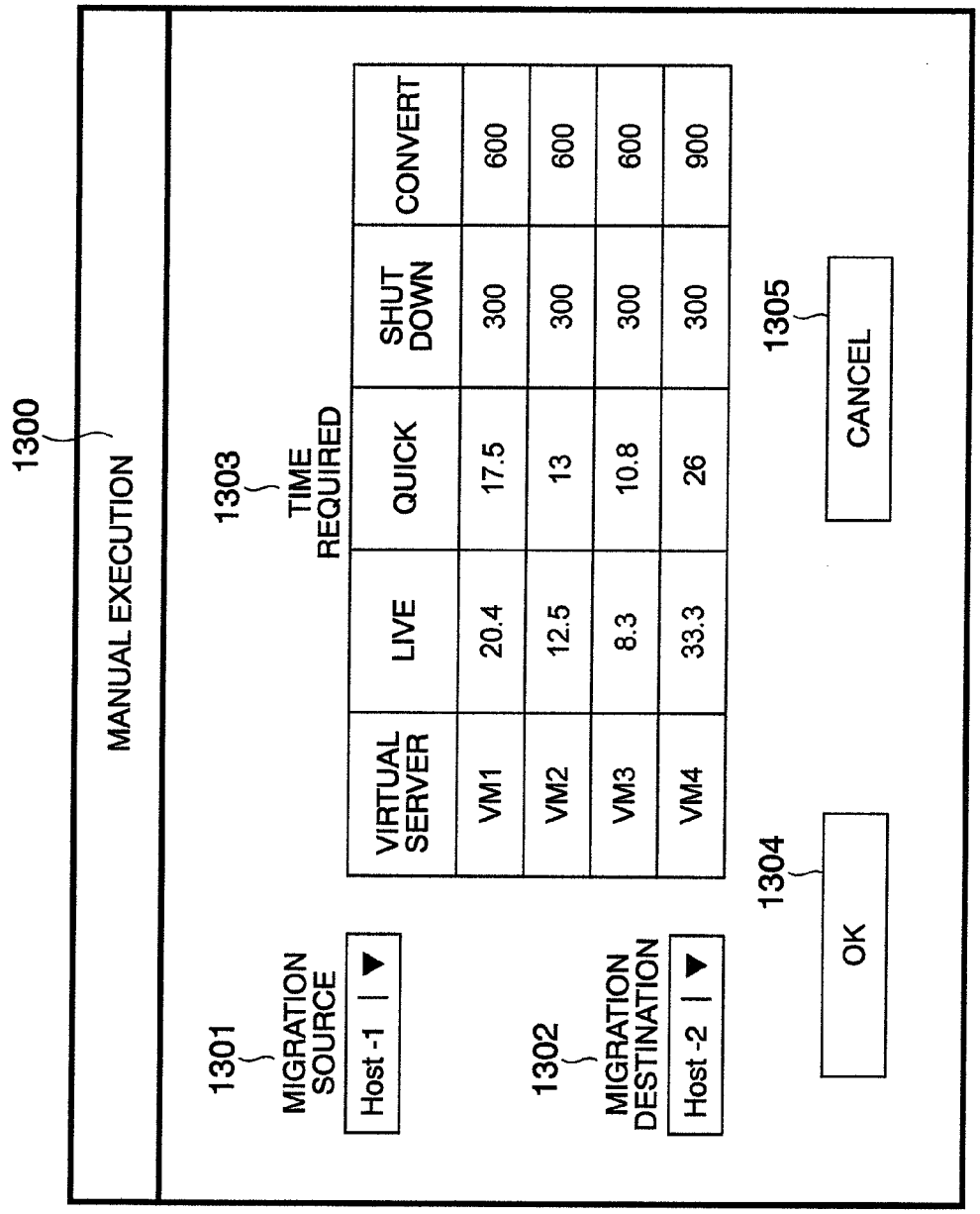
FIG. 13 shows an example of a GUI for operating the migration method decision part manually.

FIG. 13 shows an example of a graphical user interface (GUI) as an example of a user interface (UI) provided by the migration method decision part 110 to make the user operate the migration method decision part 110 manually. This GUI is displayed in the output device 132 connected to the management server 100 or a display device of another terminal connected to the management server 100 through the network 130 by means of browser or dedicated program and text and the like.

Buttons for operation are displayed in window 1300 of manual execution. Migration source 1301 is to display pull-down menu for selecting a migration source, that is, the virtualization system 120 to be migrated by the migration method decision part 110. Migration destination 1302 is to display pull-down menu for selecting the virtualization system 120 which is the migration destination of the virtual server 121 selected by the migration source 1301. The virtualization systems 120 of migration source 1301 and migration destination 1302 are displayed by host identifiers of the physical servers 101 in which the virtualization systems 120 are operated. The time required 1303 represents migration time that the virtual server 121 of migration source 1301 is migrated to migration destination 1302. The time required displayed in the time required 1303 corresponds to the required time 701 of the failover information table 313.

Figure 14:
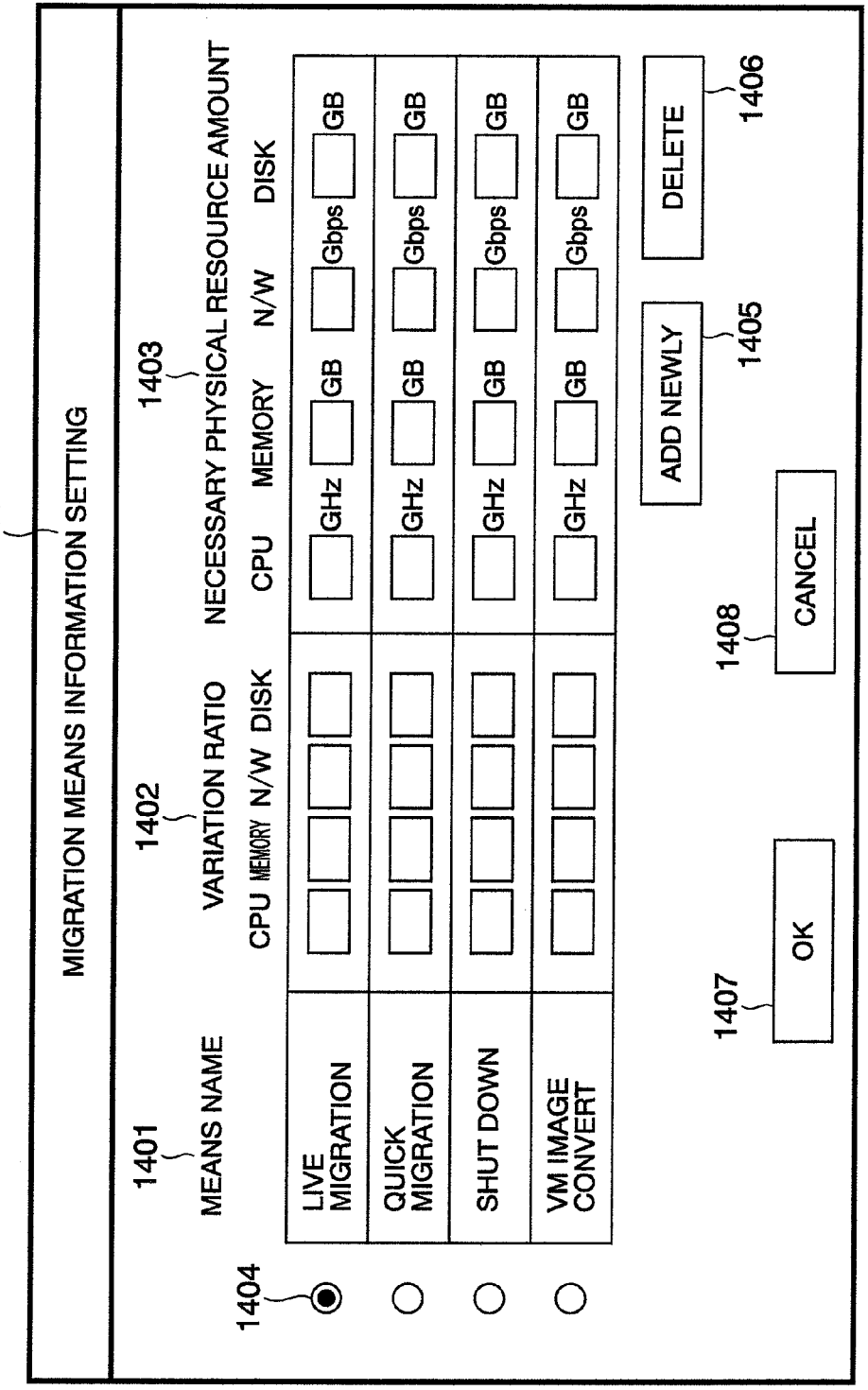
FIG. 14 shows an example of a GUI for setting the migration means information table.

FIG. 14 shows an example of a graphical user interface (GUI) as an example of a user interface (UI) provided by the migration method decision program 110 to make the user set contents of the migration means information table 310. This GUI is displayed in the output device 132 connected to the management server 100 or a display device of another terminal connected to the management server 100 through the network 130 by means of browser or dedicated program and text and the like.

Buttons for operation are displayed in a migration means information setting window 1400. Migration means information displayed in the window 1400 is based on contents of the migration means information table 311. The user clicks button 1404 to select migration means information to be updated. Means identifiers 400 for identifying the migration means are inputted in means name input box 1401. Value 401 indicating the relation (variation ratio) between change in occupancy state of resources of virtual server and time required for migration of each migration means is inputted in variation ratio input box 1402. Physical resource amount 402 required for execution of migration means is inputted in necessary physical resource amount input box 1403. When button 1405 is clicked, new migration means information can be added and when button 1406 is clicked, migration means information selected by button 1404 can be deleted. When set information is updated, button 1407 is clicked and when it is canceled, cancel button 1408 is clicked. When button 1407 is clicked, the migration method decision part 110 reflects contents of means name input box 1401, variation ratio input box 1402 and necessary physical resource amount input box 1403 to migration means information table 310.

Embodiment 2

In the embodiment 1, the decision method of the migration schedule information in case where the virtual servers 121 are successively migrated has been described. In this embodiment 2, description is made to the case where a plurality of virtual servers are migrated simultaneously.

Figure 15:
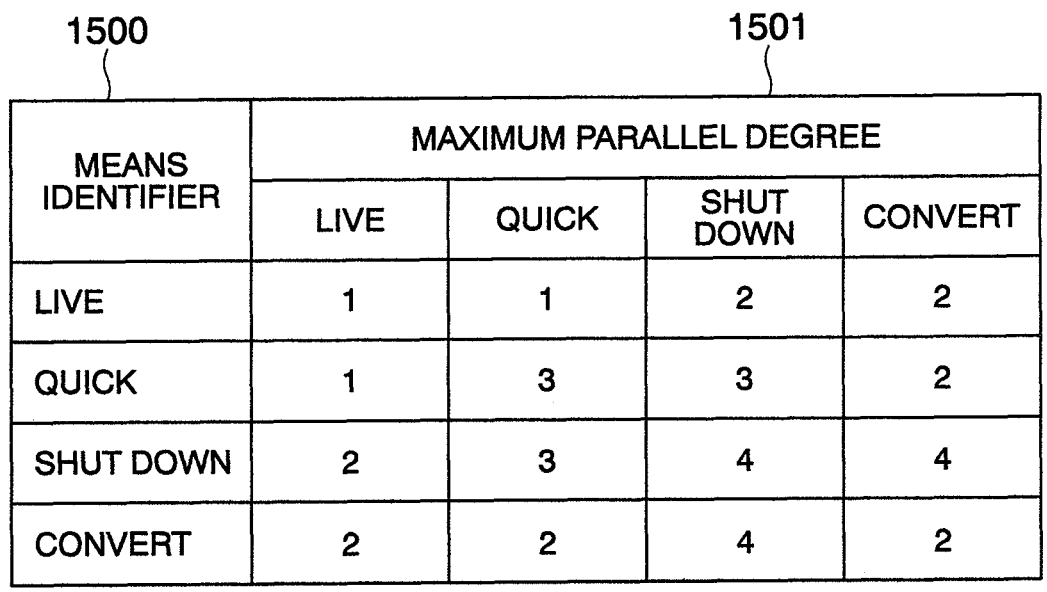
FIG. 15 is a diagram showing structure of a parallelism information table.

In the embodiment, the start time 804 shown in the migration schedule information table 314 is used. When the start time 804 of a certain virtual server 121 comes even when another virtual server 121 is being migrated, migration of the certain virtual server 121 is executed. In the embodiment, the parallelism information table 315 is used. FIG. 15 shows structure of the parallelism information table 315. Column 1500 shows means identifiers for identifying the migration means. Concretely, the means identifiers are names defined by means provider and user (or system manager). Column 1501 shows the maximum simultaneous execution number when the means or combination thereof is executed in parallel. For example, first record shows how many migrations can be performed simultaneously when a certain virtual server is migrated using live migration and other virtual servers are migrated using the migration means. Since value in section defined by row and column of live migration of the table is 1, a plurality of virtual servers cannot be migrated simultaneously using live migration. On the other hand, since value in section defined by row of live migration and column of shut down is 2, up to 2 virtual servers can be migrated using live migration and shut down simultaneously.

Figure 16:
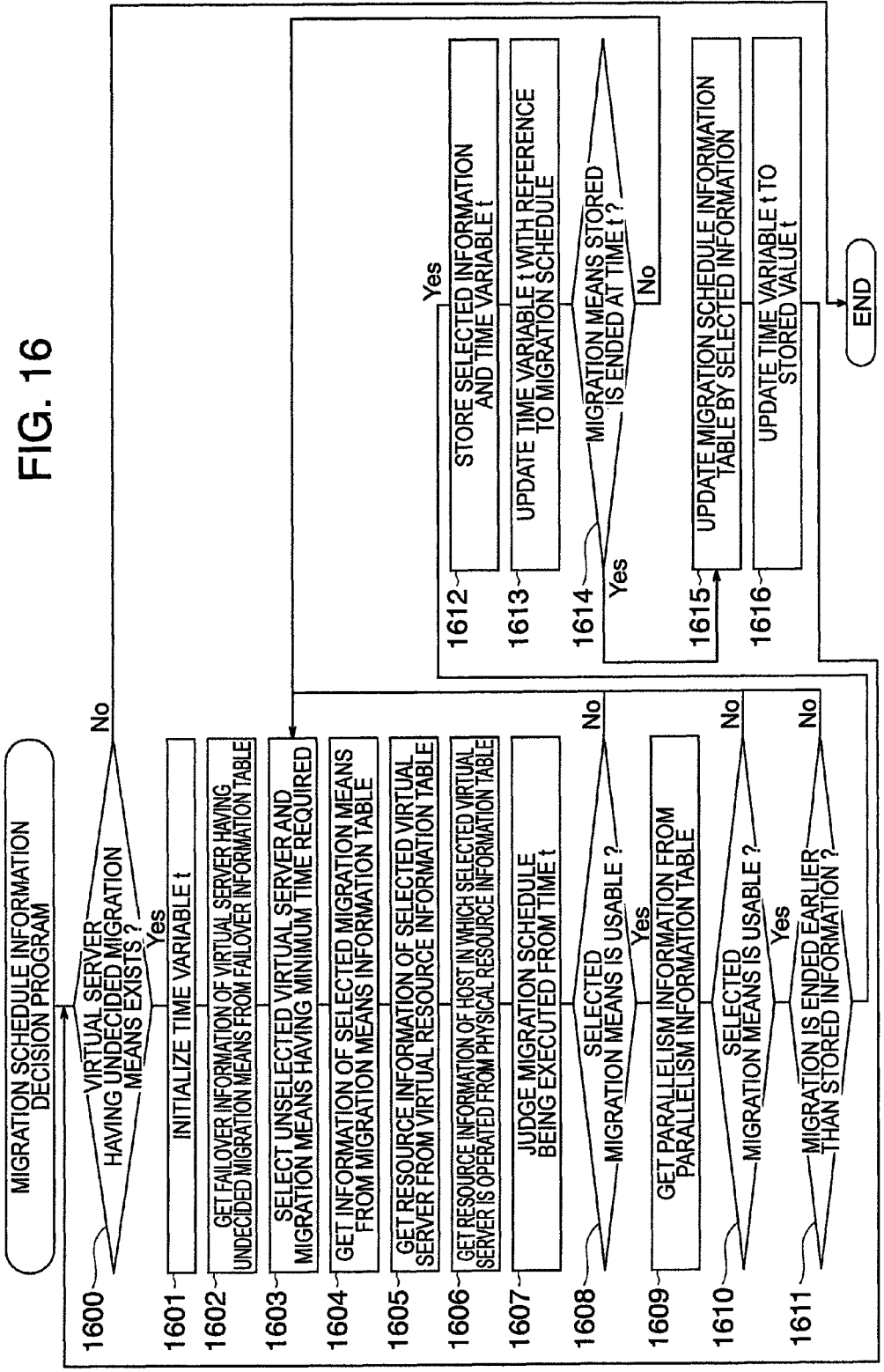
FIG. 16 is a flow chart showing processing of a second migration schedule information decision part.

FIG. 16 is a flow chart showing processing performed by the migration schedule information decision part 301 of the embodiment. The processing of FIG. 16 is the changed processing of the migration schedule information decision part 301 shown in FIG. 11 of the embodiment 1 so as to meet the embodiment 2. The processing of FIG. 16 is different from FIG. 11 in that steps 1601, 1607, 1609 to 1614 and 1616 are added and the processing in step 1107 is changed to the processing in step 1615.

In step 1601, variable t for storing time information is initialized. Concretely, value of 0 or the like is stored in the variable t. In the embodiment, memory area is secured for the variable t at the beginning of processing of the migration schedule information decision part 301 and the memory area is released at the end of the processing.

In step 1607, it is judged whether the virtual server 121 indicated in each record of the migration schedule information table 314 is being migrated at time indicated by the variable t. The judgment is made on the basis of comparison of the variable t and the sum calculated by adding the required time 701 of the failover information table 313 and the start time 804 of the migration schedule information table 314. The required time 701 is gotten from the failover information table 313 using the virtual server identifier 801 and the means identifier 802. When the calculated sum is smaller than or equal to the variable t, migration of the virtual server 121 indicated by the record is ended. When the sum is larger than the variable t and the start time 804 is smaller than or equal to the variable t, migration of the virtual server 121 indicated by the record is being performed. Moreover, when the start time 804 is larger than the variable t, migration of the virtual server 121 indicated by the record is not started.

In step 1608, the necessary physical resource amount 402 is both of the physical resource amount required by the migration means selected in step 1603 and the physical resource amount required by the migration means decided as being executed in step 1607 and indicated by the record of the migration schedule information table 314.

All records of the parallelism information table 315 are gotten (step 1609). It is evaluated whether a new migration schedule having the time indicated by the variable t as the start time may be added in the migration schedule information table 314, that is, whether new record is added thereto (selected migration means is usable?) (step 1610). When it cannot be added, the processing is returned to step 1603. This evaluation is made using the means identifier 400 of the migration means information table 310 for the migration means selected in step 1603 and the means identifier 802 of the record of the migration schedule information table 314 decided as being executed in step 1607.

It is evaluated whether it is more suitable to execute the virtual server and the migration means selected in step 1603 at the time indicated by the variable t (step 1611). Concretely, comparison as to whether migration is ended earlier than the virtual server and the migration means selected in past step 1603 and stored as optimum at present is made. When it is not ended earlier, the processing is returned to step 1603. This comparison is made using the variable t, the required time 701 and the start time 804.

The variable t and the virtual server and the migration means selected in step 1603 are stored (step 1612). The variable t is updated with reference to the migration schedule information table 314 (step 1613). Concretely, the minimum start time 804 larger than the variable t is set as the variable t. When there is no minimum start time 804 larger than the variable t, a very large value or negative value is set as the variable t.

It is evaluated whether migration of the virtual server 121 stored in step 1612 is ended at time shown by the variable t (step 1614). That is, it is judged whether there is a possibility that more suitable virtual server 121 and execution means exist after the time shown by the variable t. When there is the possibility, the processing proceeds to step 1615 and when there is no possibility, the processing is returned to step 1603. The stored variable t and the stored required time for the migration means are added to calculate the sum thereof and the calculated sum is compared with the variable t updated in step 1613 to make the evaluation.

The virtual server identifier 801, the means identifier 802, the execution order 800 and the host identifier 803 showing the migration destination for the virtual server 121 and the migration means stored in step 1612 are added to the migration schedule information table 315 as new record (step 1615). The variable t stored in step 1612 is set as the variable t (step 1616).

According to the embodiment, the migration method decision part 110 can decide the migration means and the execution order of the virtual server 121 as parallel executable migration schedule to improve the availability of the system. Consequently, migration of the virtual server can be performed more efficiently as compared with the embodiment 1.

Figure 17:
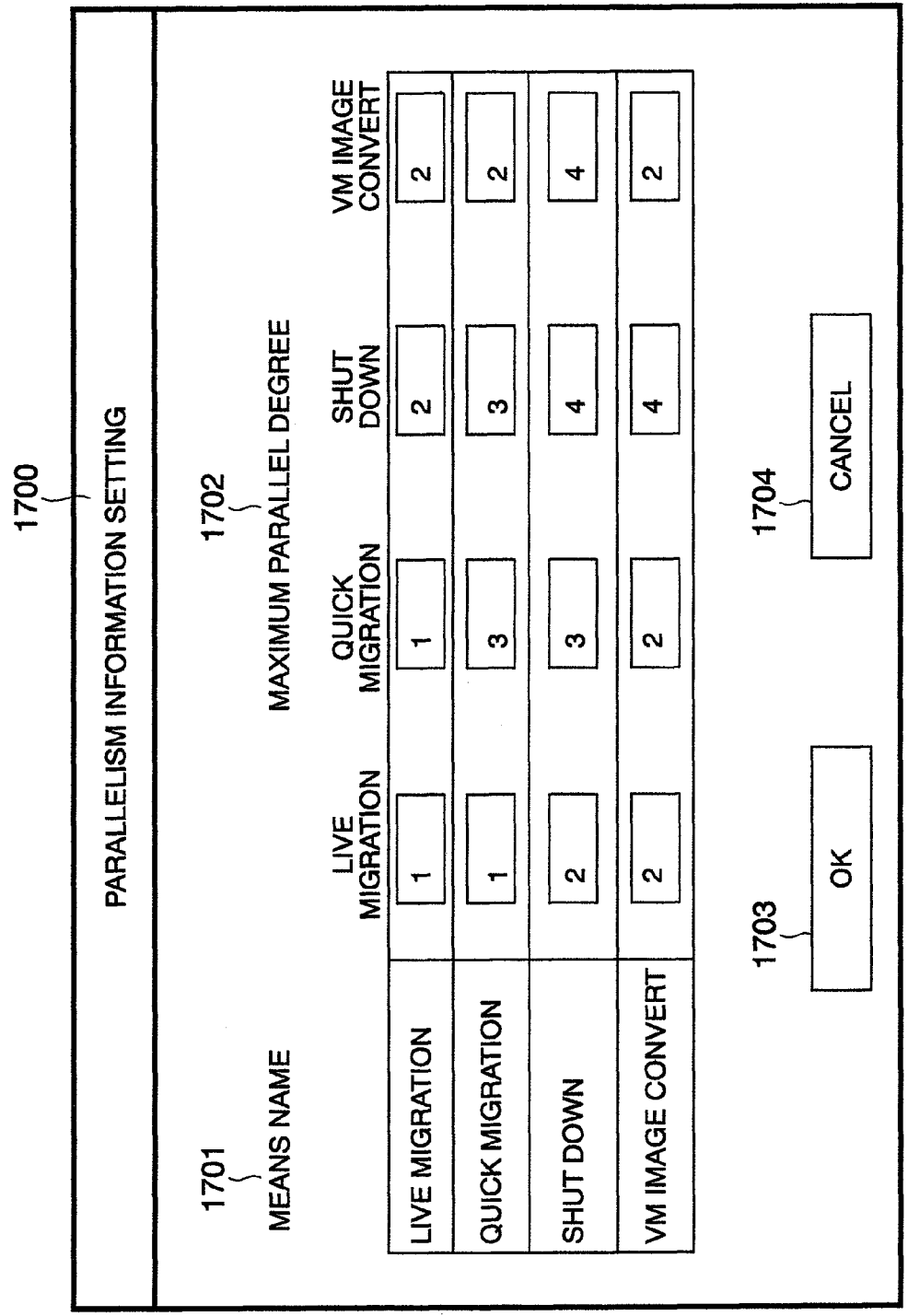
FIG. 17 shows an example of a GUI for setting the parallelism information table.

FIG. 17 shows an example of a graphical user interface (GUI) as an example of a user interface (UI) provided by the migration method decision part 110 to make the user set the contents of the parallelism information table 315. This GUI is displayed in the output device 312 connected to the management table 100 or a display device of another terminal connected to the management server 100 through the network 130 by means of browser or dedicated program and text and the like.

Parallelism information and buttons for operation are displayed in parallelism information setting window 1700. The parallelism information displayed in the window 1700 is based on contents of the parallelism information table 315. Means identifier for identifying the migration means is displayed in means name 1701. The maximum simultaneous execution number (maximum parallel degree) 1501 in case where the migration means or combination thereof is executed in parallel is inputted to maximum parallel degree input box 1702. When the user updates the setting, button 1703 is clicked and when user cancels the setting, button 1704 is clicked. When the button 1703 is clicked, the migration method decision part 110 reflects the contents of the maximum parallel degree box 1702 to the parallelism information table 315.

Embodiment 3

In the embodiment 1, the migration schedule information has been decided in units of the virtual server. In this embodiment 3, the case where the migration schedule information is decided for work performed by at least one virtual server in units of work is described. In the embodiment 3, the work information table 316 is used.

FIG. 18 shows structure of the work information table 316. The work information table 316 holds features of work (virtual server that performs work and the like). Column 1800 shows work identifiers for identifying work. Concretely, the work identifiers are names defined by the user (or server manager). Column 1801 shows virtual server identifiers for identifying the virtual servers 121 that perform work. Concretely, the virtual server identifiers are names defined by the user (or server manager). Column 1802 shows information concerning SLA of work. The information of column 1802 contains priority 1810 showing importance of work and down permissible time 1811 showing time during which stop of work is permitted. The priority 1810 of work may use an integer or a value based on the user access number, the number of execution transactions per unit time and the like.

Figure 19:
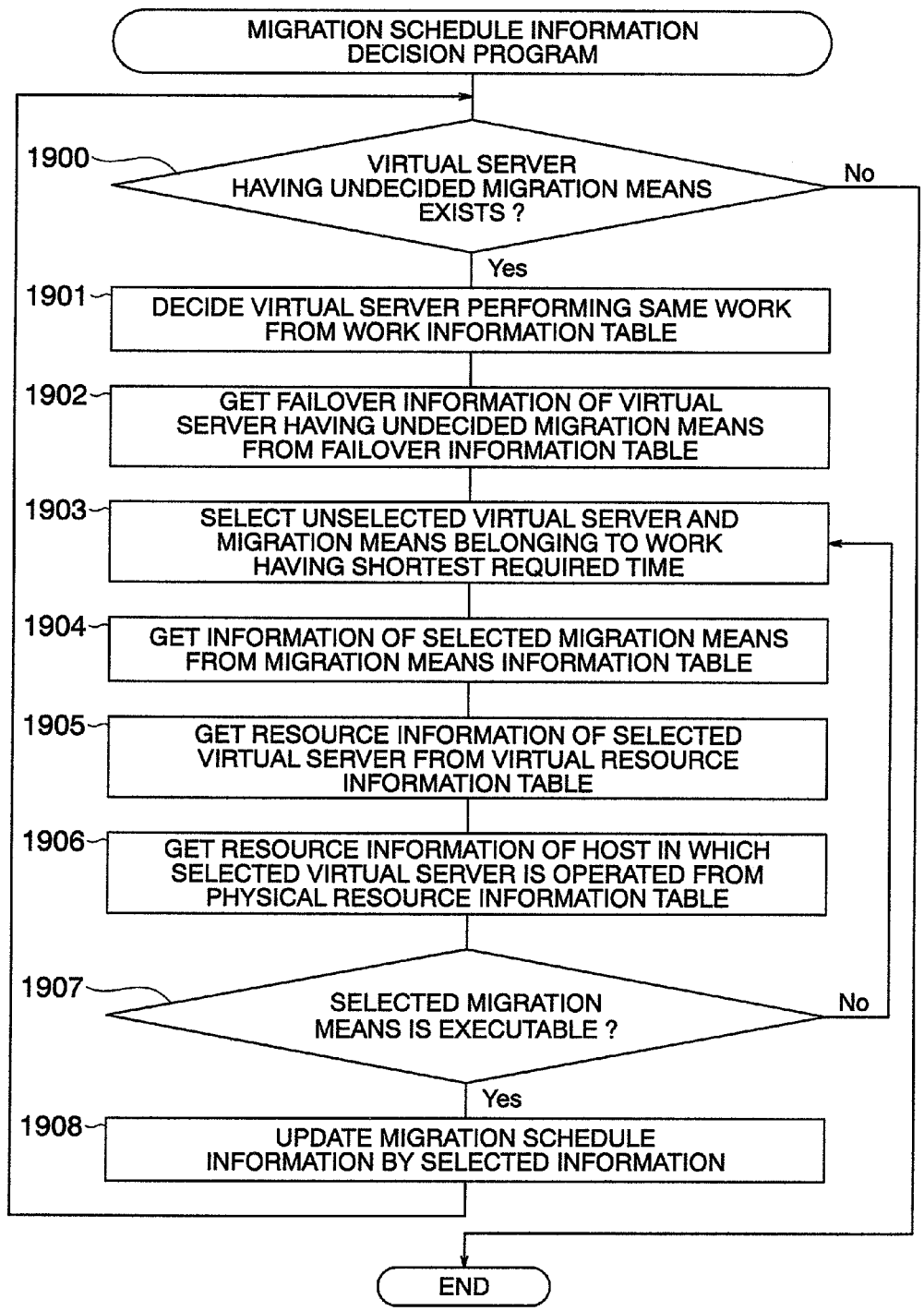
FIG. 19 is a flow chart showing processing of a third migration schedule information decision part.

FIG. 19 is a flow chart showing processing of the migration schedule information decision part 301 of the embodiment. The processing of FIG. 19 is the changed processing of the migration schedule information decision part 301 shown in FIG. 11 of the embodiment 1 so as to meet the contents of the embodiment 3. The processing of FIG. 19 is different from FIG. 11 in that step 1901 is added and processing contents of steps 1903 to 1906 are changed.

The virtual servers are grouped by work (step 1901). Concretely, the work identifier 1800 and the virtual server identifier 1801 of the work information table 316 are gotten. Work belonging to work having shortest required time and not selected once in this processing, that is, at least one set of virtual server 121 and migration means is selected (step 1903). Concretely, the required time is decided by the sum total of required times 701 of the failover information table 313 for the virtual server 121 grouped in step 1902. The necessary physical resource amount 402 of record having the means identifier 400 of the migration means information table 310 for at least one migration means selected in step 1903 is gotten (step 1904). The host identifier 501 of record having the virtual server identifier 500 of the virtual resource information table 311 for at least one virtual server 121 selected in step 1903 is gotten (step 1905).

According to the embodiment, the migration method decision program 110 can decide the migration schedule information in units of work. Thus, the virtual server 121 belonging to the same work can be operated at adjacent timing so that the virtual server can be migrated to secure the availability of work as compared with the embodiment 1.

Figure 20:
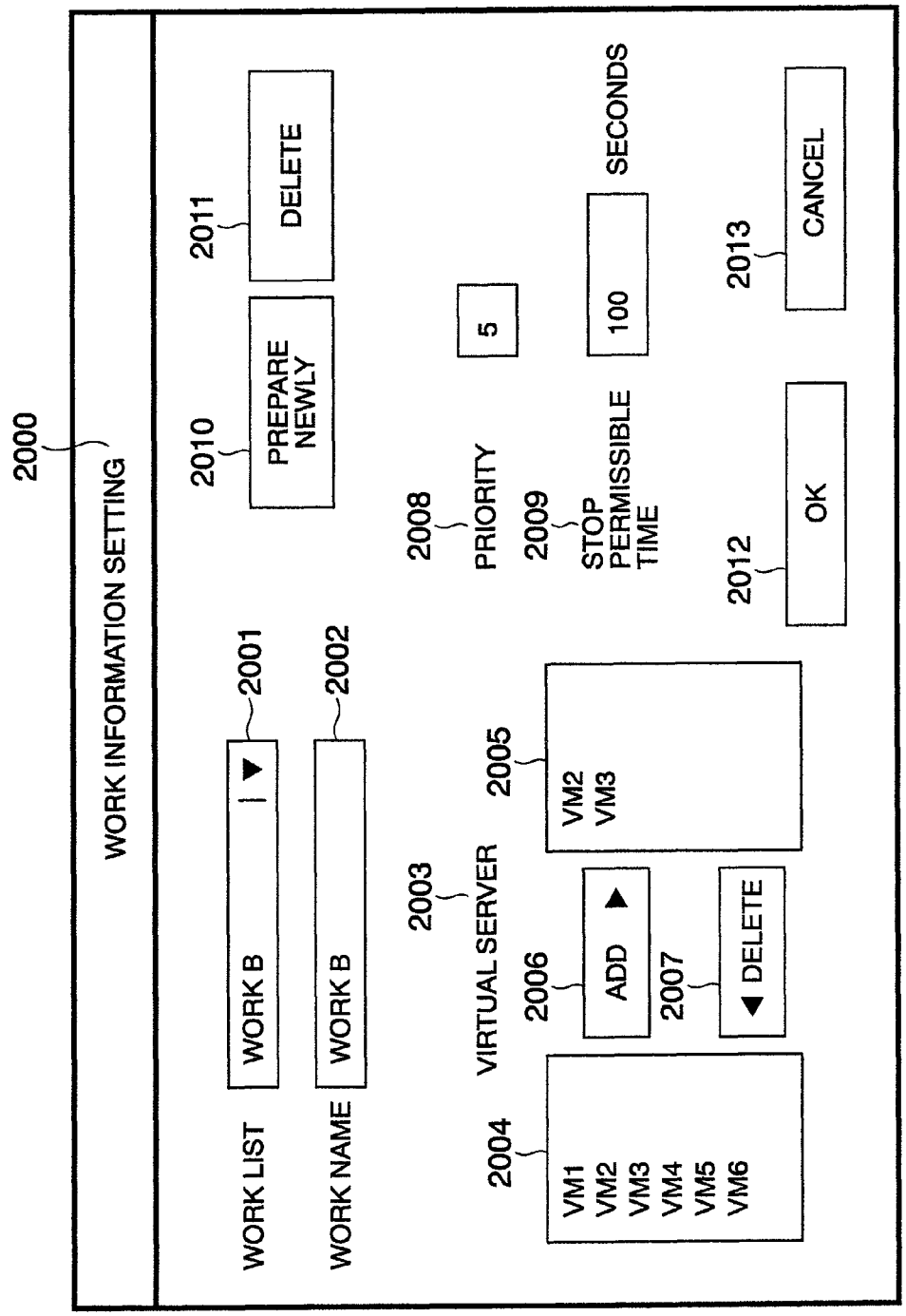
FIG. 20 is a diagram showing an example of a GUI for setting the work information table.

FIG. 20 shows an example of a graphical user interface (GUI) as an example of a user interface (UI) provided by the migration method decision part 110 to make the user set contents of the work information table 316. This GUI is displayed in the output device 132 connected to the management server 100 or a display device of another terminal connected to the management server 100 through the network 130 by means of browser or dedicated program and text and the like.

Work information setting window 2000 is a window for browser, program and the like. Work list 2001 is a box for selecting work to be set by user by means of pull-down menu. Work name input box 2002 is a box for inputting work identifier (column 1800) for the work selected in the work list 2001. Virtual server list 2003 is to set virtual server 121 (virtual server identifier 1801 of work information table 316) which performs work selected in the work list 2001. List 2004 is a box for selecting virtual server 121 added for execution of work to be set. List 2005 is a box for displaying virtual server identifier 1801 for executing work to be set and selecting virtual server 121 to be deleted from execution of work to be set. When button 2006 is clicked, the virtual server 121 selected in list 2004 is moved to list 2005. When button 7 is clicked, the virtual server 121 selected in list 2005 is moved to list 2004. In priority input box 2008, priority (priority 1810 of work information table 316) for work selected in work list 2001 is inputted. In stop permissible time input box 2009, stop permissible time (down permissible time 1811 of work information table 316) for work selected in work list 2001 is inputted. When button 2010 is clicked, new work can be added and when button 2011 is clicked, work selected in work list 2001 can be deleted. When setting of work information is updated, button 2012 is clicked and when it is canceled, cancel button 2013 is clicked. When button 2012 is clicked, the migration method decision part 110 reflects contents of work name input box 2002, virtual server list 2003, priority input box 2008 and stop permissible time input box 2009 to work information table 316.

Embodiment 4

In the embodiment 3, the migration schedule information has been decided in units of work. In this embodiment 4, the migration schedule information is decided in consideration of priority of work. In the embodiment 4, the priority information 1810 of the work information table 316 is used.

Figure 21:
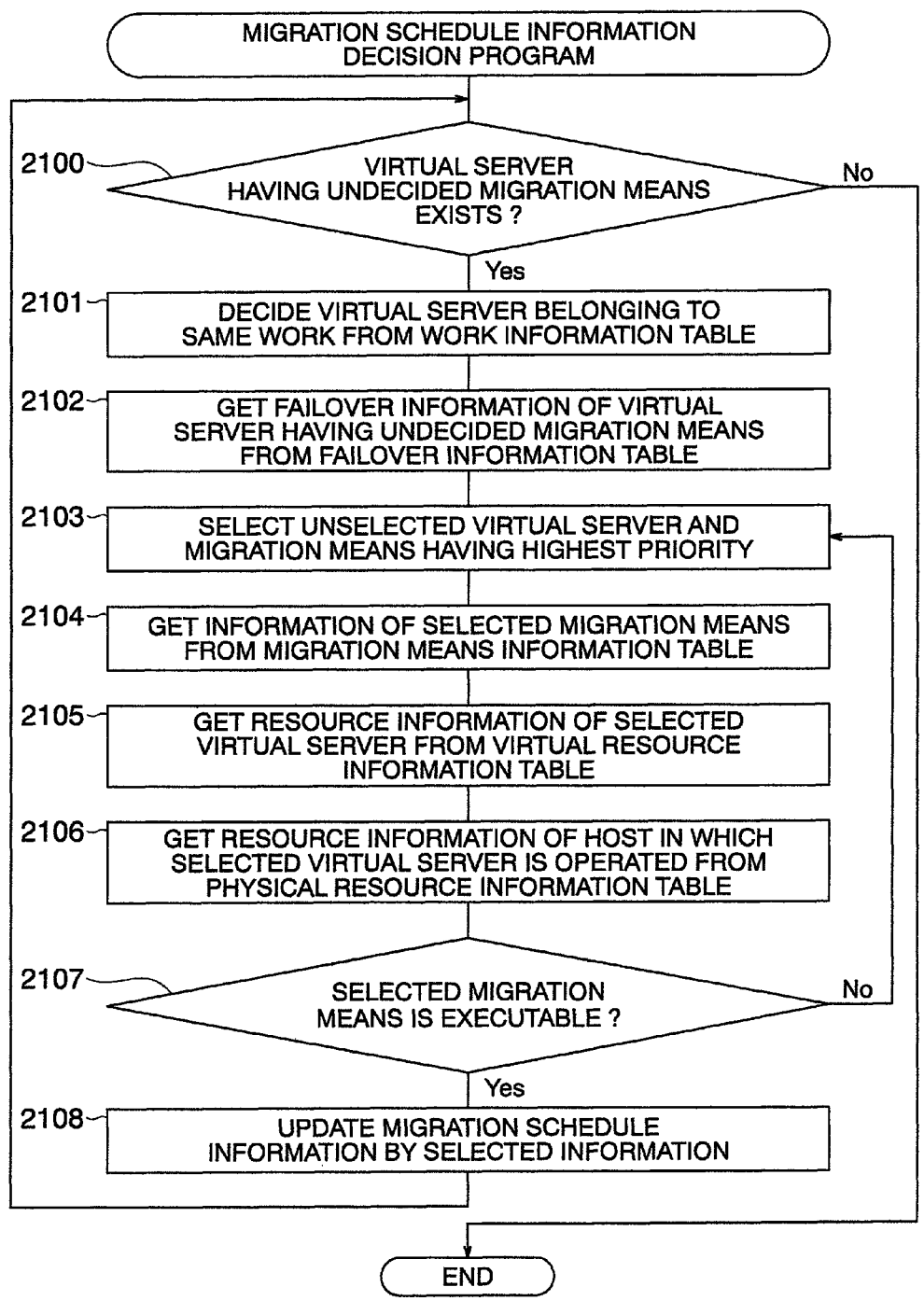
FIG. 21 is a flow chart showing processing of a fourth migration schedule information decision part.

FIG. 21 is a flow chart showing processing of the migration schedule information decision part 301 of the embodiment. The processing of FIG. 21 is the changed processing of the migration schedule information decision part 301 shown in FIG. 19 of the embodiment 3 so as to meet the embodiment 4. The processing of FIG. 21 is different from FIG. 19 in that step 2103 is added and step 1903 is deleted.

Work having the highest priority and not selected once in this processing, that is, at least one set of virtual server 121 and migration means is selected (step 2103). The priority refers to the priority 1810 of the work information table 316.

According to the embodiment, the migration method decision part 110 can decide migration schedule information in units of work on the basis of the priority among works. Thus, migration can be performed in order from the virtual server 121 which performs more important work (for example, work having a lot of execution transaction number per unit time) as compared with the embodiment 3.

Embodiment 5

In the embodiment 4, the migration schedule information of the virtual server 121 has been decided in units of work in consideration of the priority of work. In this embodiment 5, the migration schedule information is decided on the assumption that the virtual server which performs at least one work (for example, work having low priority) is stopped beforehand.

Figure 22:
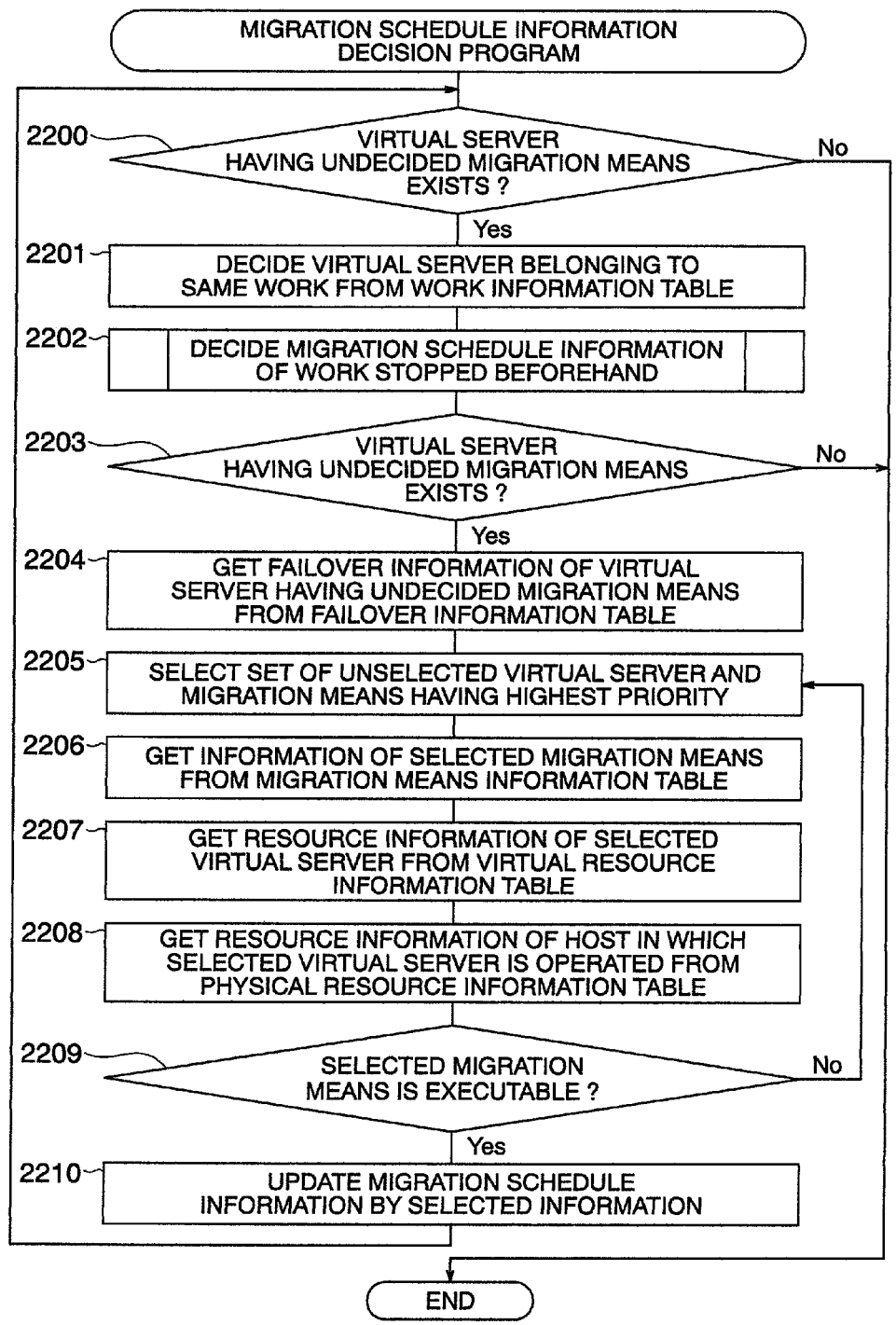
FIG. 22 is a flow chart showing processing of a fifth migration schedule information decision part.

FIG. 22 is a flow chart showing processing of the migration schedule information decision part 301 of the embodiment. The processing of FIG. 22 is the changed processing of the migration schedule information decision part 301 shown in FIG. 21 of the embodiment 4 so as to meet the contents of the embodiment 5. The processing of FIG. 22 is different from FIG. 21 in that steps 2202 and 2203 are added and processing contents of step 2209 is changed.

The migration schedule information of the virtual server 121 is decided for work stopped beforehand (step 2202). Detailed processing of step 2202 is shown in a flow chart of FIG. 23. It is judged whether there is any virtual server of which migration means is undecided (step 2203) except the virtual server 121 having migration schedule information decided so as to stop work beforehand in step 2202. When there is no virtual server, the processing is ended.

Similarly to step 2107, it is evaluated whether the selected virtual server and migration means are executable (step 2209). However, in the evaluation, physical resource used by the virtual server 121 which performs work to be stopped beforehand in step 2202 is not considered.

Figure 23:
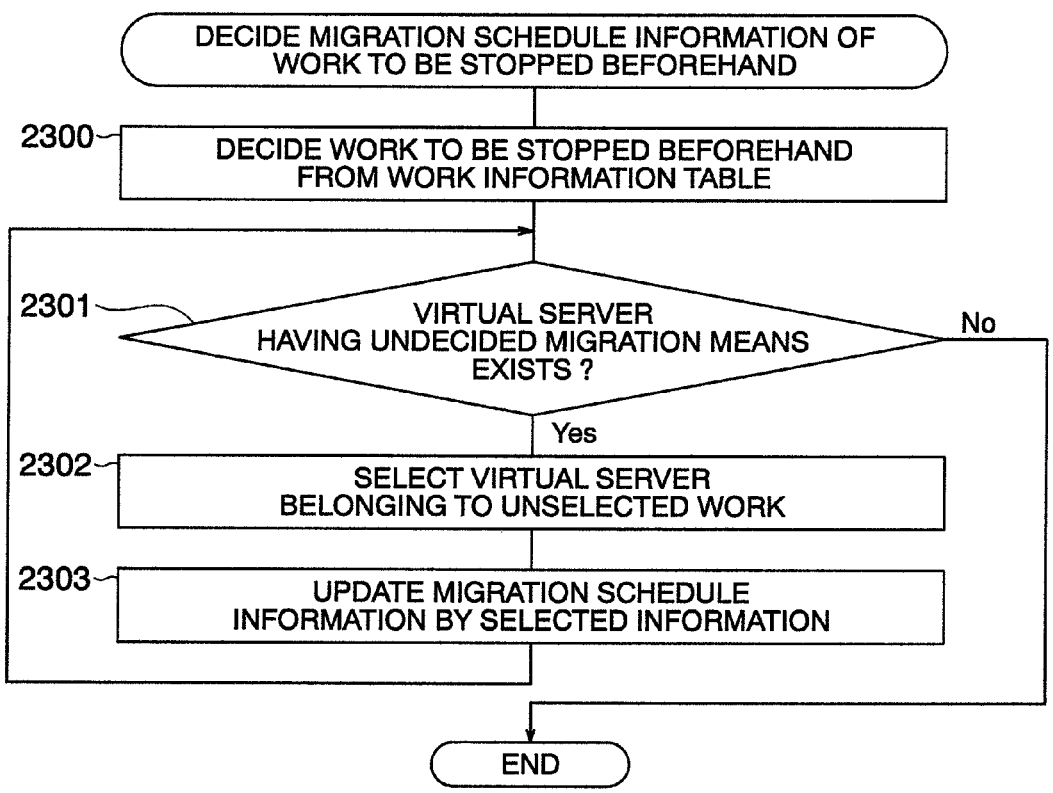
FIG. 23 is a flow chart showing processing of deciding migration schedule information of virtual server which performs work to be stopped beforehand.

FIG. 23 is a flow chart showing detailed processing of deciding the migration schedule information of the virtual server 121 which performs work to be stopped beforehand in step 2202. Work to be stopped beforehand is decided with reference to SLA information 1802 (step 2300). This decision is made, for example, by setting the threshold of priority in the migration method decision part 110 and comparing the set threshold with the priority 1810. Alternatively, the time required for the migration method (for example, shut down) accompanied by stop of the virtual server 121 is compared with the stop permissible time (column 1811).

It is confirmed whether there is any virtual server 121 which performs work to be stopped beforehand and decided in step 2300 and has undecided migration means (step 2301). When there is no virtual server, the processing is ended and returns to step 2203 of FIG. 22.

At least one virtual server 121 which perform the work which is decided in step 2300 and is not selected once in this processing is selected (step 2302). In the selection, the sum of the required time 701 of the failover information table 313 is used as in step 1903, although priority 1810 or combination thereof may be used.

In step 2303, similarly to step 2210, information concerning the virtual server 121 selected in step 2302 is used to add new record to the migration schedule information table 314. As the means identifier 802, that is, the used migration means, the migration means accompanied by stop of the virtual server 121 is used (for example, shut down).

According to the embodiment, at least one work (for example, unimportant work) is stopped beforehand to release physical resources to be used by the stopped work, so that more physical resources can be utilized for migration of the virtual server 121 which performs other work (for example, important work).

Embodiment 6

In the embodiment 4, the migration schedule information of the virtual server 121 has been decided in units of work in consideration of the priority of work. In this embodiment 6, the migration schedule information is decided on the assumption that migration order is delayed for the work which requires time for migration or does not require prompt migration although the priority thereof is high.

Figure 24:
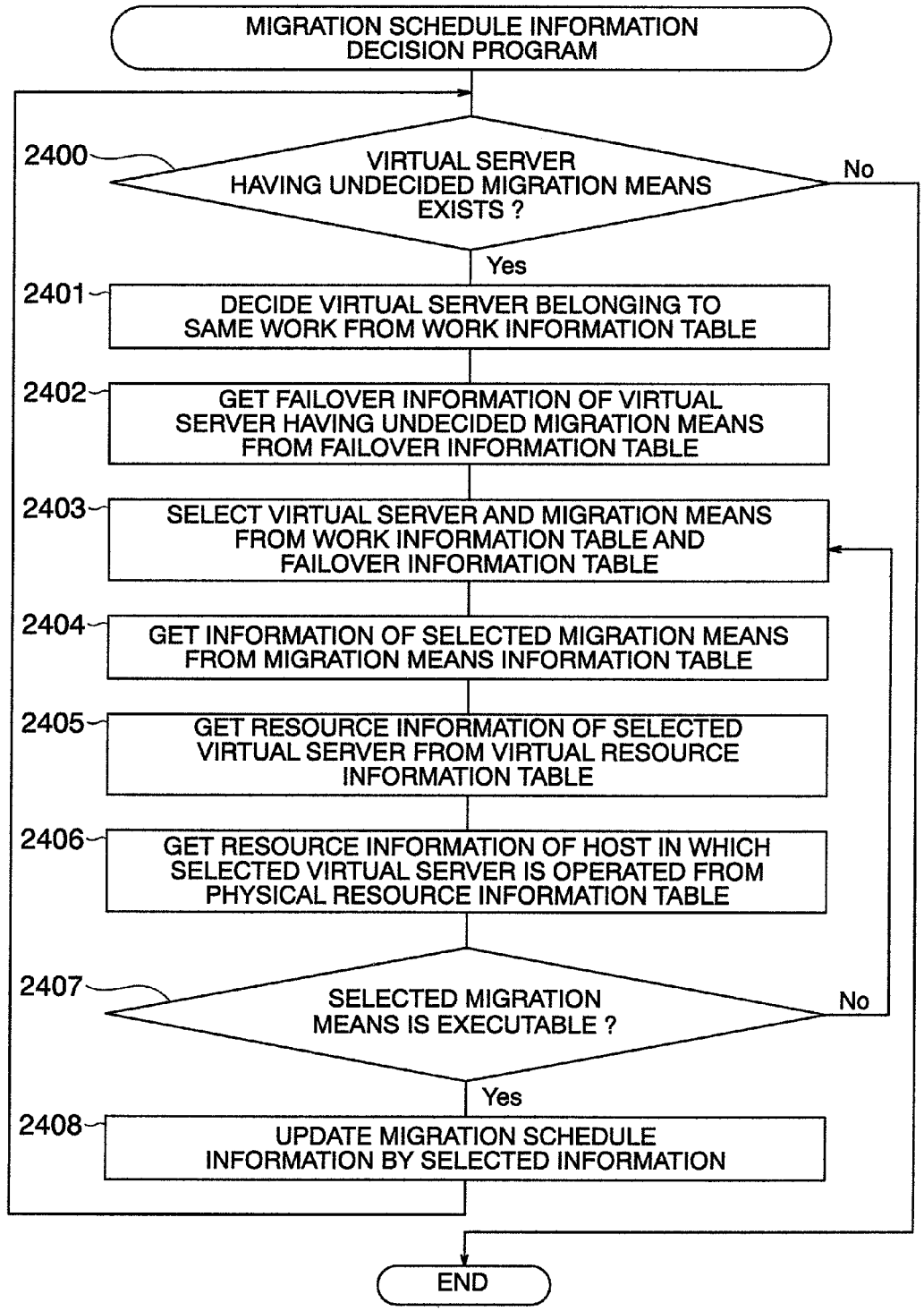
FIG. 24 is a flow chart showing processing of a sixth migration schedule information decision part.

FIG. 24 is a flow chart showing processing of the migration schedule information decision part 301 of the embodiment. The processing of FIG. 24 is the changed processing of the migration schedule information decision part 301 shown in FIG. 21 of the embodiment 4 so as to meet the embodiment 6. The processing of FIG. 24 is different from FIG. 21 in that the processing contents of step 2403 is changed.

Similarly to step 2103, work which is not selected once in the processing is selected (step 2403). The selection is made on the basis of SLA information 1802 of the work information table 316, required time 701 of the failover information table 313, migration schedule information 314 or combination thereof. Concretely, it is quotient of the sum of the required time 701 and the priority 1810 or difference of the downtime permissible time 1811 and the migration start time (decided from columns 802 and 701).

According to the embodiment, for example, even when certain work has high priority but takes time for migration (for example, the number of virtual servers 121 which perform this work is large), migration schedule information that does not prevent migration for other work can be decided.

Embodiment 7

In the embodiment 1, the migration schedule information has been decided in units of virtual server. In this embodiment 7, the migration schedule information is decided in consideration of influence on the computer system by occurrence of trouble. In this embodiment, the risk information table 317 is used.

FIG. 25 shows an example of the risk information table 317. The risk information table 317 holds conditions in case of decision of migration method for trouble occurred in the physical server 101 and the virtualization system 120 (for example, when trouble of temperature occurs in CPU, migration means which operates CPU hard is not used frequently). Column 2500 shows risk identifiers for identifying risk (for example, CPU temperature abnormal). Concretely, the risk identifiers are names defined by user (or server manager). Column 2501 shows condition given to processing of the migration method decision part 110 by the risk. For example, when abnormality of CPU temperature occurs, the migration schedule is decided so as not to use CPU beyond 60%.

FIG. 26 is a flow chart showing processing of the migration schedule information decision unit 301 of the embodiment. The processing of FIG. 26 is the changed processing of the migration schedule information decision part 301 shown in FIG. 11 of the embodiment 1 so as to meet the embodiment 7. The processing of FIG. 26 is different from FIG. 11 in that steps 2607 and 2608 are added.

Condition 2501 of record having the risk identifier 2500 of the risk information table 317 corresponding to trouble information from the information getting part 302 is gotten (step 2607). It is evaluated whether the condition gotten in step 2607 is broken by executing the virtual server 121 and the migration means selected in step 2602 (for example, when trouble of network adapter occurs, it is evaluated whether the migration means utilizes the network adapter) (step 2608). When it is broken, the processing is returned to step 2602.

According to the embodiment, the migration schedule information can be decided in consideration of trouble occurred. Consequently, the problems that migration of virtual server induces trouble, resources necessary for migration of virtual server cannot be used due to trouble to fail in migration and so on can be avoided.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of deciding a migration method executed in a management server connected to a physical server to migrate a virtual server operated in a virtualization system which is operated in the physical server, wherein the management server stores, into a storage unit:
physical resource information including maximum physical resource amount indicating performance of the physical server which operates the virtualization system;
virtual resource information including occupied virtual resource coefficient indicating physical resource amount used by the virtual server and allocated physical resource coefficient indicating physical resource amount allocated to the virtual server in corresponding manner to the virtual server; and
migration means information including variation ratio indicating degree of influence exerted by change of the occupied physical resource used by the virtual server on migration time required for migrating the virtual server by migration means and reference execution time required for migrating the virtual server by the migration means on the basis of predetermined occupied physical resource amount; and the method comprises the steps of:
calculating occupancy amount of physical resource of the virtual server on the basis of the maximum physical resource amount of the physical server and the occupied virtual resource coefficient and the allocated physical resource coefficient of the virtual server;
calculating change value of the occupied physical resource amount used by the virtual server being the target of migration on the basis of the calculated occupancy amount of physical resource and the predetermined occupied physical resource amount of the virtual server; and
calculating the migration time required for migrating the virtual server by the migration means on the basis of the calculated change value, the variation ratio and the reference execution time.

2. A method of deciding a migration method according to claim 1, wherein the migration means having short migration time required of the virtual server is selected.

3. A method of deciding a migration method according to claim 2, wherein when there are a plurality of virtual servers, migration order of the virtual servers by the migration means is defined to start from the virtual server having short migration time required corresponding to the migration means selected for the virtual server.

4. A method of deciding a migration method according to claim 3, wherein the management server further stores, into the storage unit, parallelism information including maximum parallel degree indicating permissible value of parallel execution of the migration means is provided and the migration means corresponding to the plurality of virtual servers are executed in parallel in the execution order within range in which the maximum parallel degree is not exceeded.

5. A method of deciding a migration method according to claim 3, wherein the management server further stores, into the storage unit, work information indicating relation between work performed by each of the plurality of virtual servers and priority of the work is provided and the virtual server which performs work having high priority is selected to execute migration means corresponding to the virtual server.

6. A method of deciding a migration method according to claim 5, wherein the work information contains down permissible time of work and the virtual server to be stopped beforehand is decided with reference to the down permissible time.

7. A method of deciding a migration method according to claim 2, wherein risk information indicating correspondence of risk identifier indicating trouble occurring in the physical server and operation condition upon occurrence of the trouble is provided and the migration means of the virtual server is selected within range in which the operation condition is not broken.

8. A management server connected to a physical server to decide a method of migrating a virtual server operated in a virtualization system which is operated in the physical server, the management server stores, into a storage unit:

physical resource information including maximum physical resource amount indicating performance of the physical server which operates the virtualization system;

virtual resource information including occupied virtual resource coefficient indicating physical resource amount used by the virtual server and allocated physical resource coefficient indicating physical resource amount allocated to the virtual server in corresponding manner to the virtual server;

migration means information including variation ratio indicating degree of influence exerted by change of the occupied physical resource used by the virtual server on migration time required for migrating the virtual server by migration means and reference execution time required for migrating the virtual server by the migration means on the basis of predetermined occupied physical resource amount; and a migration method decision part to perform the following:

calculating occupancy amount of physical resource of the virtual server on the basis of the maximum physical resource amount of the physical server and the occupied virtual resource coefficient and the allocated physical resource coefficient of the virtual server;

calculating change value of the occupied physical resource amount used by the virtual server being the target of migration on the basis of the calculated occupied amount of physical resource and the predetermined occupied physical resource amount of the virtual server; and calculating the migration time required for migrating the virtual server by the migration means on the basis of the calculated change value, the variation ratio and the reference execution time.

9. A management server according to claim 8, wherein the migration method decision part selects the migration means having short migration time required of the virtual server.

10. A management server according to claim 9, wherein the migration method decision part defines migration order of the virtual server by the migration means to start from the virtual server having short migration time required corresponding to the migration means selected for the virtual server when there are a plurality of virtual servers.

11. A management server according to claim 10, the management server further stores, into the storage unit, parallelism information including maximum parallel degree indicating permissible value of parallel execution of the migration means and wherein the migration method decision part executes the migration means corresponding to the plurality of virtual servers in parallel in the execution order within range in which the maximum parallel degree is not exceeded.

12. A management server according to claim 10, the management server further stores, into the storage unit, work information indicating relation between work performed by each of the plurality of virtual servers and priority of the work and wherein the migration method decision part selects the virtual server which performs work having high priority to execute migration means corresponding to the virtual server.

13. A management server according to claim 12, wherein the work information contains down permissible time of work and the migration method decision part decides the virtual server to be stopped beforehand with reference to the down permissible time.

14. A management server according to claim 10, comprising:

risk information indicating correspondence of risk identifier indicating trouble occurring in the physical server and operation condition upon occurrence of the trouble and the migration method decision part selects the migration means for the virtual server within range in which the operation condition is not broken.

* * * * *